(12) United States Patent
Ryan et al.

(10) Patent No.: US 6,280,119 B1
(45) Date of Patent: Aug. 28, 2001

(54) APPARATUS AND METHOD FOR PLACING AND ENGAGING ELONGATE WORKPIECES

(75) Inventors: William Joseph Ryan, Boca Raton; John Robert DeBruijn, Hollywood; James Rudy Gray, Boca Raton, all of FL (US)

(73) Assignee: Ryan Incorporated Eastern, Deerfield Beach, FL (US)

( * ) Notice: Subject to any disclaimer, the term of this patent is extended or adjusted under 35 U.S.C. 154(b) by 0 days.

(21) Appl. No.: 09/335,652

(22) Filed: Jun. 18, 1999

Related U.S. Application Data
(60) Provisional application No. 60/090,024, filed on Jun. 19, 1998.

(51) Int. Cl.[7] ............................. B66C 1/62; B66C 3/00
(52) U.S. Cl. ..................... 405/156; 405/175; 405/179; 414/745.5; 294/104
(58) Field of Search ............................. 405/154, 156, 405/169–171, 174, 175, 179; 414/910, 746.5, 745.6, 745.5, 745.4, 22.51; 294/104; 37/414

(56) References Cited

U.S. PATENT DOCUMENTS

| Re. 32,532 | 10/1987 | Sonerud | 414/747 |
|---|---|---|---|
| 1,877,974 | * 9/1932 | Robb . | |
| 2,830,548 | 4/1958 | McElvany | 111/5 |
| 2,959,310 | * 11/1960 | Meister . | |
| 3,180,672 | 4/1965 | Bjorklund et al. | 294/88 |
| 3,207,326 | 9/1965 | Enix | 214/1 |
| 3,292,379 | 12/1966 | McElvany | 61/72.5 |
| 3,354,661 | 11/1967 | Russell | 61/72.5 |
| 3,410,431 | 11/1968 | Vik | 214/620 |
| 3,426,929 | 2/1969 | Vik | 214/778 |

(List continued on next page.)

FOREIGN PATENT DOCUMENTS

| 26 22 751 A1 | 11/1977 | (DE) | F16L/1/02 |
|---|---|---|---|
| 29 18 382 A1 | 11/1980 | (DE) | F16L/1/02 |
| 2 682 408 A1 | 4/1993 | (FR) | E02F/5/10 |
| 2 682 409 A1 | 4/1993 | (FR) | E02F/5/10 |
| 2 027 781 A | 2/1980 | (GB) | B63C/11/00 |
| 1139813 A | 2/1985 | (SU) | E03F/3/06 |

OTHER PUBLICATIONS

The Pipe–Lift Concrete Pipe Lifter, Advertisment, undated.
Kenco, The Pipe–Lift Concrete Pipe Lifter, Date Unknown. (4 sheets).

*Primary Examiner*—Roger Schoeppel
(74) *Attorney, Agent, or Firm*—Wilheim Law Service; Thomas D. Wilhelm

(57) ABSTRACT

The invention contemplates a working implement, for use with an excavating type machine, which semi-automatically brings a pipe section to a specified grade, slope, and line for emplacement in a line of pipe sections to be laid on the specified grade slope and line. The implement is rigidly mounted to the excavation machine whereby the position of the implement can be maintained within narrow tolerances while the pipe section is linearly inserted into a previously laid pipe section, and can be retained at the specified grade, slope, and line while fill material is emplaced and consolidated about and under the pipe, with sufficient density that the pipe can be released without the pipe moving outside normal tolerances of the specified grade, slope and line. In general, the invention contemplates the machine and implement automatically bringing the pipe section to such specified height or grade, thus bringing the pipe section into position and angular alignment with respect to the specified pipe line, automatically establishing and holding specified slope, and optionally cross-slope, of the pipe section. The pipe section is then linearly inserted into the previously laid pipe section by the operator manually activating the linear insertion actuator.

22 Claims, 16 Drawing Sheets

U.S. PATENT DOCUMENTS

| | | | |
|---|---|---|---|
| 3,438,523 | 4/1969 | Vik | 214/313 |
| 3,561,615 | 2/1971 | Forsberg | 214/1 |
| 3,643,715 * | 2/1972 | Hayes et al. | |
| 3,657,786 | 4/1972 | Wiswell, Jr. | 29/200 P |
| 3,834,566 | 9/1974 | Hilfiker | 215/138 R |
| 3,907,435 * | 9/1975 | Roodvoets | |
| 3,989,150 | 11/1976 | Stephenson et al. | 214/147 G |
| 4,050,589 | 9/1977 | Dolza | 214/1 PA |
| 4,111,374 | 9/1978 | Mackaness | 241/101.7 |
| 4,130,204 | 12/1978 | Pickard | 214/1 PA |
| 4,227,850 | 10/1980 | Farmer et al. | 414/620 |
| 4,244,123 | 1/1981 | Lazure et al. | 37/193 |
| 4,266,910 | 5/1981 | Pickard | 414/735 |
| 4,268,217 | 5/1981 | Perreault et al. | 414/740 |
| 4,280,785 | 7/1981 | Albrecht | 414/735 |
| 4,286,914 | 9/1981 | Davidson, Jr. | 414/460 |
| 4,343,573 | 8/1982 | Breitfuss | 405/155 |
| 4,345,854 | 8/1982 | Valantin | 405/159 |
| 4,362,435 | 12/1982 | Henry | 405/154 |
| 4,377,043 * | 3/1983 | Inui et al. | |
| 4,432,691 | 2/1984 | Sterner | 414/735 |
| 4,433,952 | 2/1984 | Glickman | 414/460 |
| 4,451,194 | 5/1984 | Keats et al. | 414/731 |
| 4,515,522 | 5/1985 | Sonerud | 414/747 |
| 4,652,195 | 3/1987 | McArthur | 414/22 |
| 4,668,156 | 5/1987 | Mason | 414/704 |
| 4,682,912 | 7/1987 | Henry | 405/154 |
| 4,714,381 | 12/1987 | Hatch | 405/178 |
| 5,009,565 | 4/1991 | Esau | 414/607 |
| 5,062,756 | 11/1991 | McArthur et al. | 414/22.51 |
| 5,065,326 | 11/1991 | Sahm | 364/424.07 |
| 5,073,080 | 12/1991 | Blum | 414/739 |
| 5,145,290 | 9/1992 | Wise | 405/179 |
| 5,219,265 | 6/1993 | Recker | 414/731 |
| 5,368,413 | 11/1994 | Moore | 405/154 |
| 5,383,758 | 1/1995 | Patrick | 414/680 |
| 5,632,574 | 5/1997 | Klaymar et al. | 405/179 |
| 5,640,748 | 6/1997 | Harrison | 29/272 |
| 5,795,101 | 8/1998 | Bill | 405/154 |
| 5,865,492 * | 2/1999 | Horton | |
| 5,918,923 * | 7/1999 | Killion | |

* cited by examiner

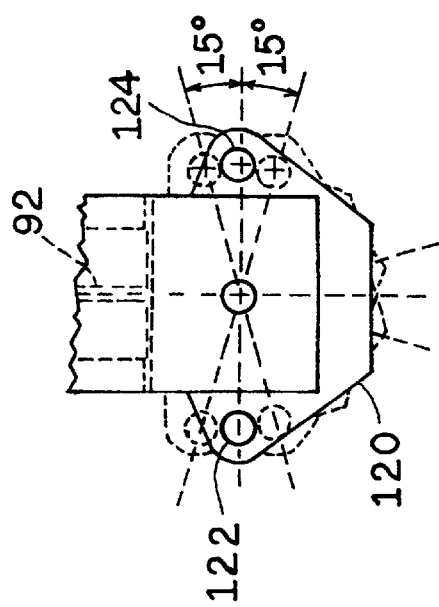
FIG. 8
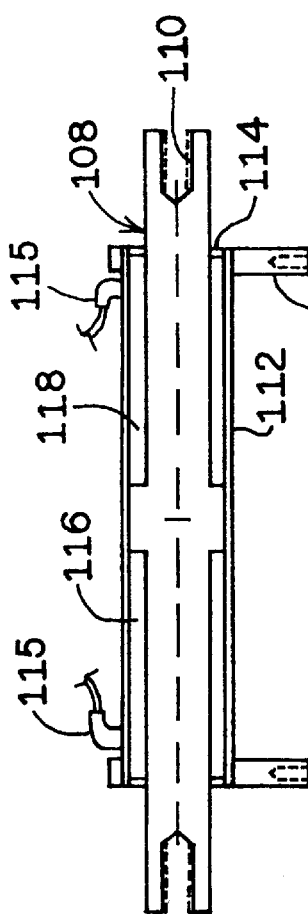
FIG. 9
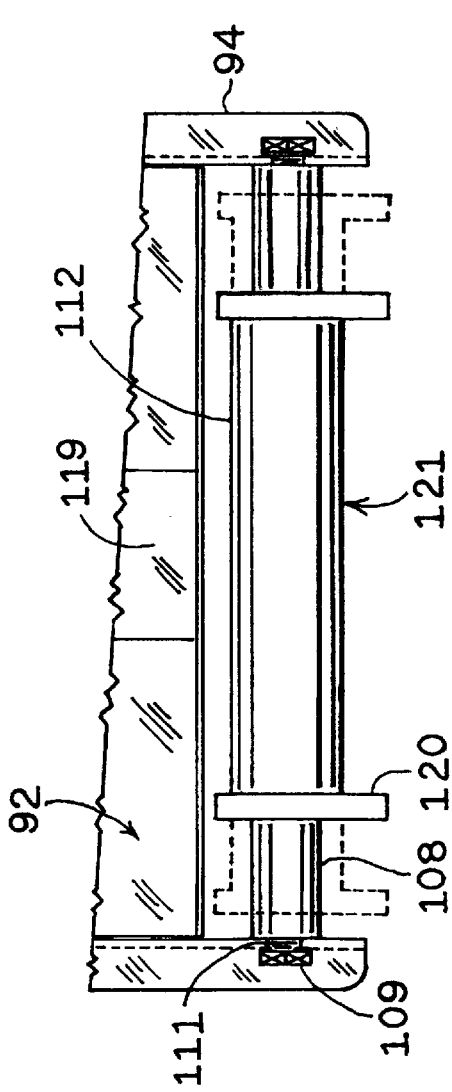
FIG. 6
FIG. 7

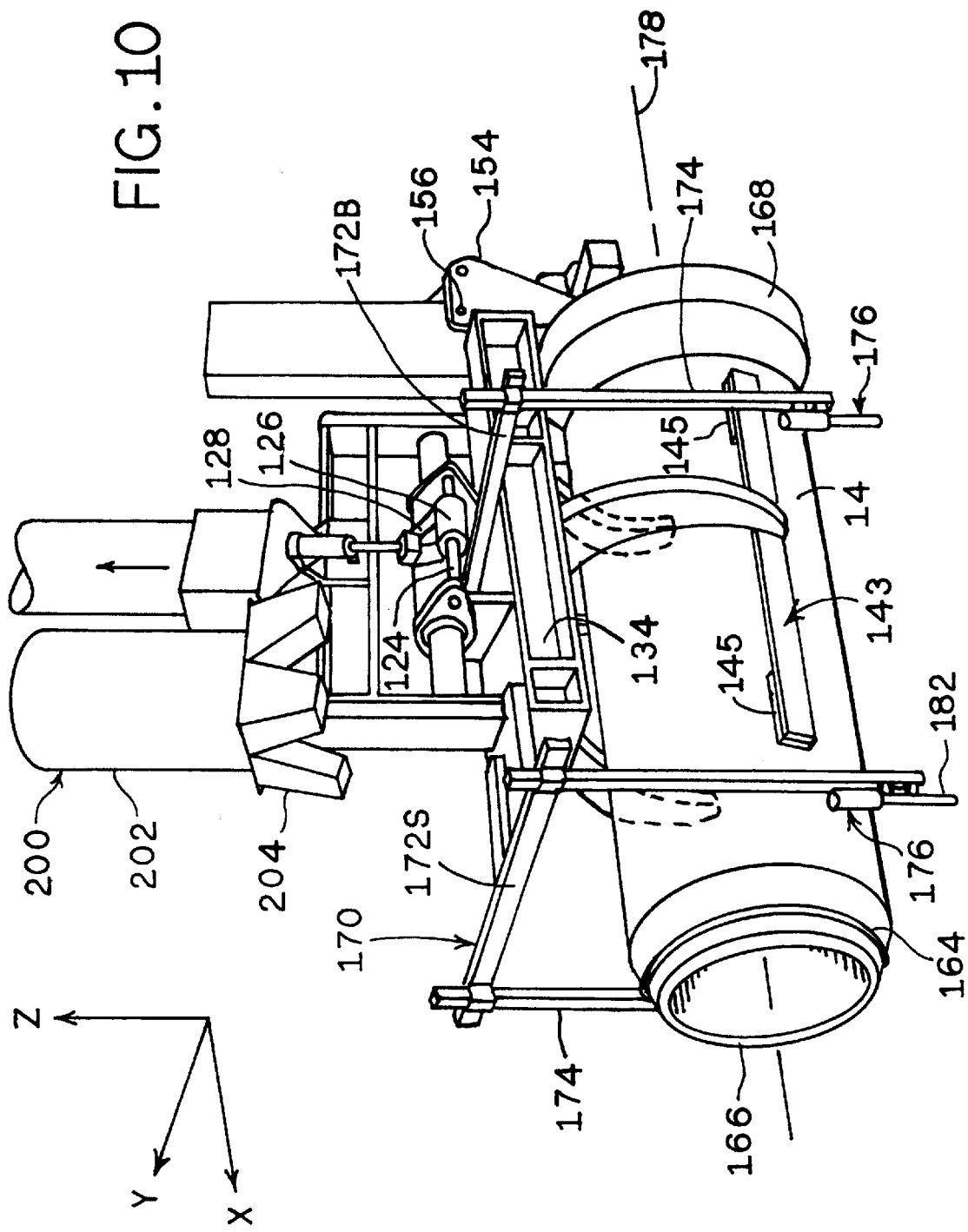

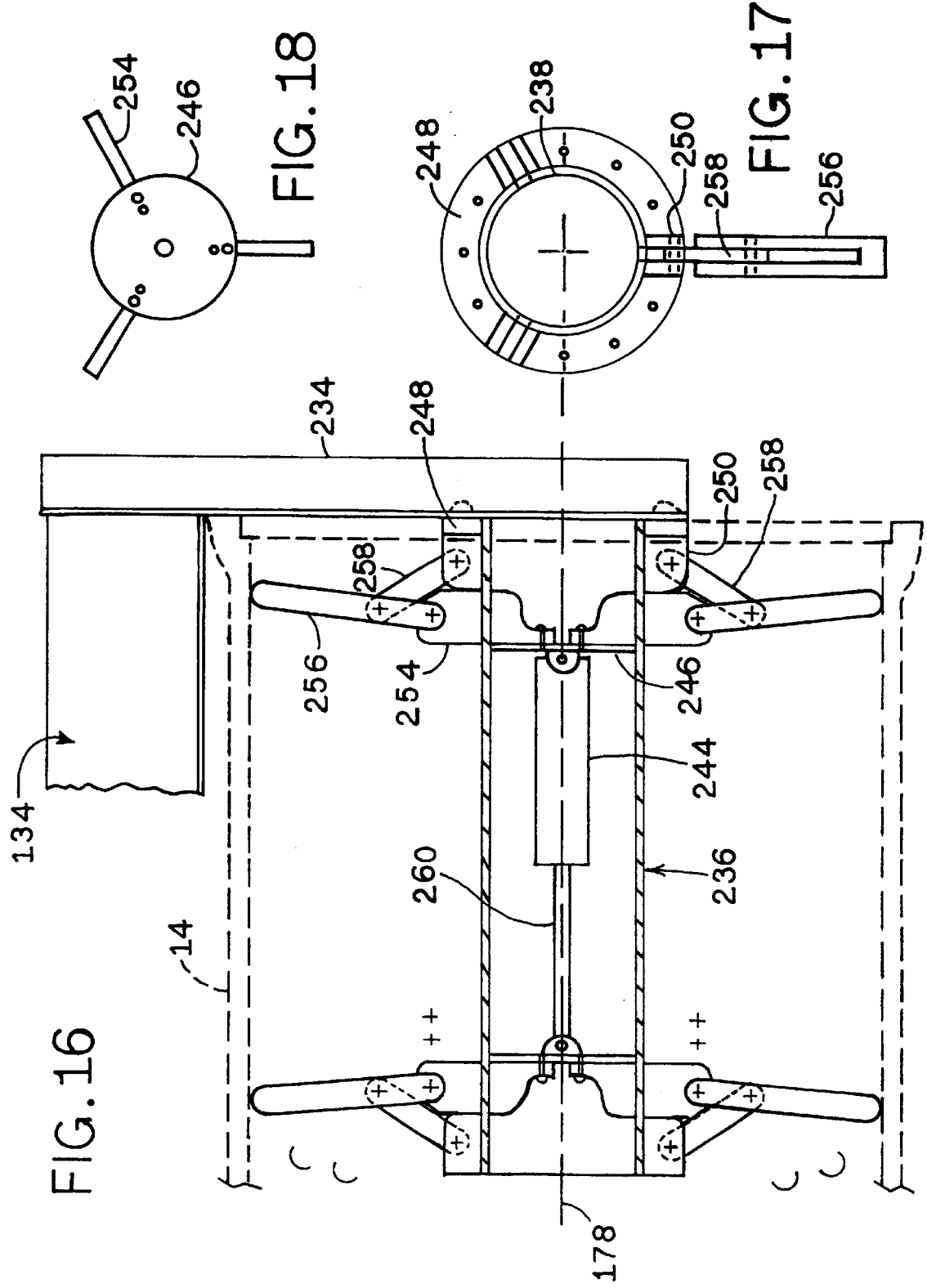

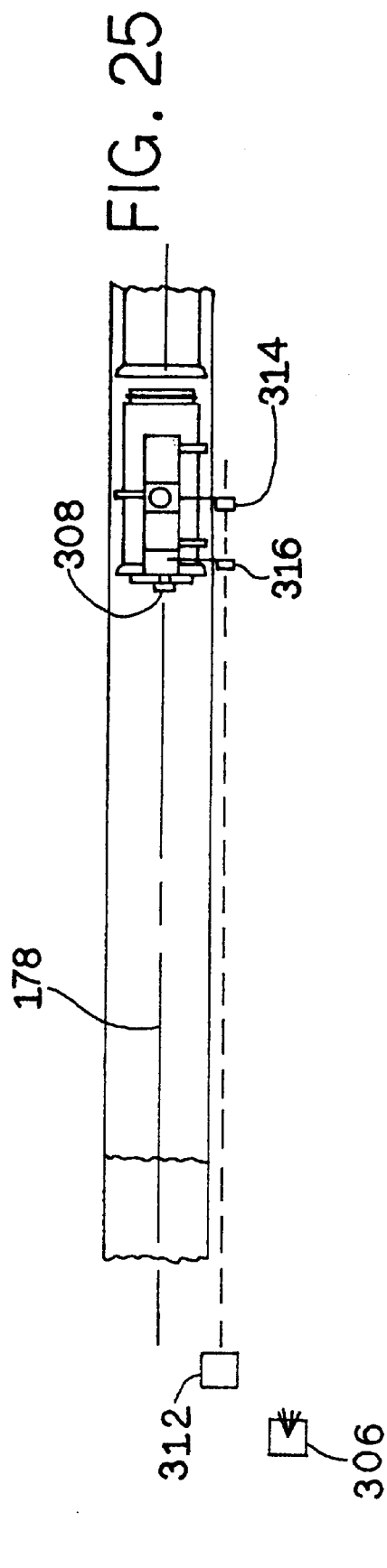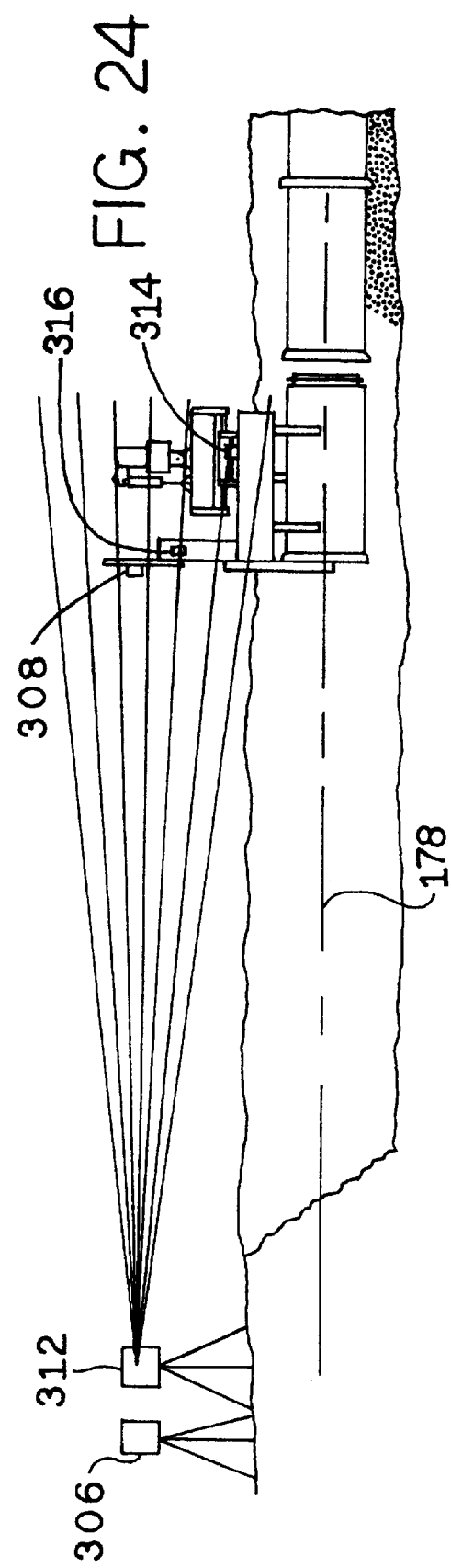

APPARATUS AND METHOD FOR PLACING AND ENGAGING ELONGATE WORKPIECES

This application claims benefit under 35 U.S.C. 120, of U.S. Provisional Application No. 60/090,024, filed Jun. 19, 1998.

BACKGROUND

Development of utility infrastructure includes laying of a variety of pipes underground, and sometimes under water, for carrying various products and services through such pipes, to and from the area being developed.

Some such pipes are quite heavy, such as concrete pipes commonly used for carrying e.g. waste water streams, storm sewer water, and the like. Such concrete pipes are sufficiently heavy that the pipes are laid as pipe sections joined to each other, end to end, typically in a trench or other generally confined course along a path.

The path is generally prepared by digging a trench along the desired path, to a desired depth and at a desired slope needed for gravity flow of the water which is to pass through the pipe. The depth and slope of the trench should be sufficiently deep, and at a desired slope along the length of the trench, to receive and support the pipe at the desired pipe depth and pipe slope.

The length of piping is created along the desired path in the trench by successively laying sections of pipe, end to end, in the trench at the desired pipe depth and pipe slope. Typically, the pipe is supported in the trench by gravel or other fill or bedding material which supports the sides of the pipe, and optionally supports the pipe from underneath, between the bottom of the pipe and the bottom of the elevated trench.

If the pipe is to be supported directly by the bottom of the trench, the trench is dug to the depth desired whereby the bottom of the pipe rests on the bottom of the trench when the pipe is at the desired depth and slope, also referred to herein as elevation/grade and slope. If the fill material is to support the pipe above the bottom surface of the trench, the trench is dug sufficiently deep that the bottom of the pipe is above the bottom of the trench when the pipe is at the desired elevation and slope.

Pipe sections are typically brought to the construction site on a truck and are placed along the proposed path to be traversed by the course of the many pipe sections which are used to create the pipe conduit along the desired path. The pipe sections are thus available, along the path of the pipe line, for placement into the trench, and for being joined to each other to create the pipe line, when the trench has been suitably prepared.

In conventional practice of installing e.g. sewer pipe, a pipe section is, suspended by a single cable, from the end of the working arm of a working machine such as a backhoe, a crane, or the like. In order to pick up the pipe, the cable must be wrapped around the middle of the pipe, since the pipe is to be lifted by a single locus along the length of the pipe. If, as commonly happens, the location where the cable is wrapped does not coincide with the center of gravity of the pipe, the pipe will tip when picked up such that the machine operator will have to set the pipe back down. A worker then adjusts the location of the cable, and the machine operator again attempts to lift the pipe. This process of lift pipe, observe for stability of lifting, lower pipe, adjust position of cable, continues until the cable is properly positioned for reasonably stable lifting of the pipe.

When the pipe is thus lifted, the pipe is free to swing left and right, and to rotate about the cable that suspends it from the working arm of the machine. The amount of such swing, if any, depends on the stability of the cable grip and the skill with which the machine operator handles the controls of the machine. Normally, a worker keeps a stabilizing hand on the pipe section as much as possible, and may hand off stabilizing the pipe section to another worker, for example a worker in the trench, as the pipe is moved toward its engagement location in the trench.

Prior to the pipe being set and positioned in the trench, the trench is prepared for the pipe. For example, where the pipe section is to be laid directly on the bottom of the trench, the depth and slope of the trench is first checked. Where the pipe section is to be laid on a bed of fill such as gravel, the gravel is brought in and prepared, and the elevation of the gravel may be checked.

When the pipe section is lowered into the trench, it is placed on the prepared underlying support at or adjacent the engagement location. Any engagement structure on the pipe section, for example a spigot, may be engaged at this stage in order to better ascertain any deviation from the desired elevation and slope of the pipe section at its finished location. All such manipulation of the pipe section in the trench requires the presence of at least one worker in the trench with the pipe section. The worker guides the pipe section into place, guides the pipe section when the pipe section is being lifted, and adds or removes material underlying the pipe section as required.

Sewer pipe can be, for example, required to be, and to remain, within 0.5 inch of the established running line of pipe sections already laid. As in the case of concrete sewer pipe which is up to 8 or more feet long, and can weight 6 tons or more, placing the weight of the pipe on the fill material or on the bottom of the trench can and does settle and compact underlying loose trench material or underlying fill material. The amount of such settling and compaction varies from location to location along the length of the trench, whether the pipe sections are laid on fill material or trench bottom material.

Thus, when the pipe section is set in the trench, the affect of the weight of the pipe on the settled elevation of the pipe is unknown. Accordingly, it is commonly necessary to lift the pipe section after settling and adjust the fill or trench material to either add material under the pipe section or remove material from under the pipe section. Such lifting, and adding or removal of fill material, requires continued presence of the worker in the trench, with the corresponding cost of such labor, and the risk that the worker may be injured, by the heavy pipe section or the lifting arm of the lifting machine.

After each such addition or removal of material under the pipe section, the pipe section is again set in place and the elevation and grade checked. This process is repeated until the pipe section is settled within specification, on path, at grade, and on slope.

Where the pipe is being laid under water, the difficulty and complexity of the process is further compounded by workers in the trench having to contend with the water. In some cases, the water is simply a nuisance. In other cases, the worker must put his head under water in order to check on the condition, placement, or other positioning of the pipe section. In addition, the worker may have to keep his head under water and give the machine operator hand signals to enable the machine operator to maneuver the pipe section into engagement with the previously laid section of pipe. Where the water is deeper, the worker in the trench may have to be completely submerged while checking the pipe section, whereby the work is even further delayed while the diver submerges and subsequently surfaces to communicate the results of this under water inspection.

An additional problem with such process is the low productivity associated with such trial and error placement of the respective pipe sections.

Thus, it is an object of the invention to provide improved apparatus and methods for laying a series of pipe sections, or other elongate workpieces, engaged in end to end relationship along a path to be traversed by such pipe sections, or other elongate workpieces.

It is another object to provide instrumentation and control of such process such that the pipe section is placed at grade, on line, and on slope the first time the pipe section is laid in the trench and engaged with the previously laid pipe section.

It is yet another object to provide apparatus and methods for laying and engaging such pipe section whereby no worker is needed in the trench for routine placement and engaging of such pipe sections.

It is still another object to provide apparatus and methods whereby the fill or bedding material is placed and settled about the pipe section while the pipe section is being held at the specified grade and slope, and in the specified direction.

Still another object is to provide apparatus and methods whereby the pipe section is held suspended above any underlying support during engagement of the pipe section with the previously laid pipe section, and is held in such position while fill or bedding material is placed and consolidated about the pipe section.

It is yet another object to provide a working implement which is rigidly mounted to the working arm of a working machine, such as a backhoe or crane, so that the working implement moves together as one with the working arm of the working machine.

It is a further object of the invention to provide a working implement having at least two level sensors providing level indications to control apparatus, the control apparatus sending control signals to activation elements which adjust the slope angle of the centerline or the bottom of a pipe section being gripped by grip elements of the implement.

It is yet another object of the invention to provide a working implement for lifting and placing pipe sections, the implement including vibrators disposed alongside the implement such that the vibrators assist with consolidation of fill material placed beside a pipe section being held in position in the trench, and optionally to employ a slurry of such fill material to assist with such consolidation.

A further object is to provide a working implement for lifting and placing a pipe section, including a cross-slope actuator on the implement affecting displacement of the pipe section in an arcuate direction transverse to the longitudinal centerline of the pipe section.

A further object is to provide an implement having an insertion cylinder that bears the weight of the pipe section being lifted and placed in the trench.

Still another object is to provide a plurality of gripping element arrangements for gripping the pipe sections, including (i) two opposed pairs of gripping arms wherein each gripping arm is articulated, (ii) a pair of pipe stops receiving a pipe section held in place by an articulated arm on the opposing side of the pipe, (iii) downwardly-extending sliding grip arms on opposing sides of the pipe whereby the grip arms move along their respective longitudinal axes to secure a pipe section against an upper stop bracket, and (iv) a lifting pig inserted into an open end of the pipe for lifting of the pipe section.

It is yet another object to sense elevation and alignment of the implement, and slope of the centerline or bottom of a pipe section being held by the grip elements, and to send position and slope commands to suitable actuators on the implement to position the implement, and set the proper slope for engaging a previously laid pipe at the desired grade, alignment, and slope.

SUMMARY

The invention contemplates a working implement, for use with an excavating type machine, which semi-automatically brings a pipe section to a specified grade, slope, and line for emplacement in a line of pipe sections to be laid on the specified grade, slope, and line. The implement is rigidly mounted to the excavation machine whereby the position of the implement can be maintained within narrow tolerances while the pipe section is linearly inserted into a previously laid pipe section, and can be retained at the specified grade, slope, and line while fill material is emplaced and consolidated about and under the pipe section, with sufficient density of fill material that the pipe can be released without the pipe section moving outside normal tolerances of the specified grade, slope and line. In general, the invention contemplates the machine and implement semi-automatically bringing the pipe section to the specified height or grade, automatically bringing the pipe section into position and angular alignment with respect to the specified pipe line, automatically establishing and holding specified slope angle, and optionally cross-slope position, of the pipe section. The pipe section is then linearly inserted into the previously laid pipe section by the operator manually activating the linear insertion actuator.

More specifically, the invention is embodied in a first family of embodiments comprising a working implement for lifting and positioning successive sections of elongate workpieces, end to end, and engaging respective ends of adjoining such sections of elongate workpieces. The implement comprises a mounting assembly having an implement mounting interface adapted and configured to attach the implement to a working arm of a working vehicle having a cooperating machine mounting interface for securely mounting the working implement to such working vehicle, such that the working implement moves as one with such working arm of such working vehicle. The implement further has a grip assembly for gripping elongate workplaces to be lifted and positioned by the working implement, orienting apparatus affecting orienting of the grip assembly with respect to respective Y and Z axes of such elongate workpiece being gripped by the grip assembly. The Y and Z axes are, respectively, perpendicular to each other. The Y axis extends generally horizontally transverse to a centerline of such workpiece. The Z axis extends upwardly, perpendicular to the longitudinal centerline of such elongate workpiece. The implement also has a linear displacement apparatus displacing the grip assembly, and correspondingly such elongate workpiece being gripped by the grip assembly, along a longitudinal such X axis of such elongate workpiece, and thereby linearly displacing the grip assembly with respect to the mounting assembly.

In preferred embodiments, the first mounting interface comprises (i) a suspension mounting element for suspending the implement from the working arm, for pivotation with respect to the working arm of the working vehicle such as an excavating machine, and (ii) a control mounting element for receiving a control element on the working arm of the working vehicle and thereby controlling pivotation of the implement with respect to the working arm, about the suspension mounting element.

In highly preferred embodiments of the invention, the secure mounting of the mounting assembly to the working vehicle enables an operator of the vehicle and correspondingly of the working implement to hold the pipe section suspended at grade, slope, and line above an underlying support surface and simultaneously to affect linear insertion of the pipe section into an end of a previously laid pipe section.

The orienting and positioning apparatus preferably further affects positioning the grip assembly with respect to an X axis parallel to the centerline of such elongate workplace being gripped in the grip assembly.

Another family of embodiments comprises working apparatus for lifting and positioning successive sections of elongate workpieces, end to end, and engaging respective ends of adjoining such sections of elongate workpieces. The working apparatus comprises a working vehicle movable along a path following a course along which the elongate workpieces are to be laid. The working vehicle comprises a working arm having an outer end portion movable with respect to the course, separate from movement of the vehicle, the outer end portion including a machine mounting interface for mounting an implement to the working arm: and a working implement. The working implement comprises (i) a mounting assembly having an implement mounting interface rigidly mounting the working implement to the working arm at the first mounting interface, whereby the working implement moves as one with the working arm of the working vehicle, (ii) a grip assembly for gripping elongate workpieces to be lifted and positioned by the working apparatus, (iii) orienting and positioning apparatus effecting orienting of the grip assembly about respective Y and Z axes, the Y axis extending generally horizontally transverse to a centerline of the workpiece, the Z axis extending upwardly, perpendicular to the longitudinal centerline of the elongate workpiece, the Y and Z axes being perpendicular to each other, and (iv) linear displacement apparatus displacing the grip assembly, and correspondingly the elongate workpiece being gripped by the grip assembly, along a longitudinal such X axis of the elongate workpiece, and thereby linearly displacing the grip assembly and the workpiece, with respect to the mounting assembly.

Preferably, the machine mounting interface and the implement mounting interface, in combination, define (i) a first suspension mounting element suspending the implement from the working arm, for pivotation with respect to the working arm, and (ii) a control mounting element receiving a control element on the working arm and thereby controlling pivotation of the working implement with respect to the working arm, about the suspension mounting element.

The invention also contemplates the above working apparatus wherein, when the working arm is held stationary, with a first longitudinal axis of a gripped first elongate workpiece in alignment with a second longitudinal axis of a previously laid second elongate workpiece, including grade, slope, and line, and the linear displacement apparatus is activated to linearly displace the first elongate workpiece into engagement with the second elongate workpiece along the aligned axes, with concomitant resistance from the second workpiece during the engagement of the first workpiece with the second workpiece, the position of the implement mounting interface remains substantially stationary with respect to the second elongate workpiece, and the first axis of the first workpiece remains in substantial alignment with the second axis of the second workpiece along grade, slope, and line, while the first workplace is being linearly displaced in engagement with the second workpiece.

A third family of embodiments comprises lifting and positioning apparatus for lifting and positioning successive sections of elongate workpieces, end to end, and engaging respective ends of adjoining such sections of elongate workpieces. The lifting and positioning apparatus of this family of embodiments comprises a mounting assembly for mounting the lifting and positioning apparatus to a working arm of a working vehicle. The mounting assembly includes a downwardly extending suspension arm and a downwardly extending central longitudinal suspension arm axis. The implement further includes a grip assembly having gripping elements for gripping elongate workpieces to be lifted and positioned by the lifting and positioning apparatus, gripping of such elongate workpiece by the gripping elements defining a longitudinal center line of the workpiece in the grip assembly. The implement further includes a first level sensor sensing level orientation of a plane perpendicular to the suspension axis, and thus sensing orientation of the suspension axis in the plane, with respect to a vertical line.

In preferred implementations, this family of embodiments includes a second level sensor sensing angular orientation, about a generally horizontal second axis, the second axis being perpendicular to a longitudinal centerline of the elongate workpiece being gripped by the grip assembly.

In preferred embodiments the invention includes orienting and locating apparatus affecting orienting and transverse locating of the grip assembly and thus orienting and transverse locating of the elongate workpiece in the grip assembly, thereby affecting orienting and transverse locating of the centerline of the elongate workpiece in the grip assembly.

Preferred embodiments of the invention also include control apparatus receiving signals from the first and second level sensors, and computing and sending control signals to the orienting and positioning apparatus thus to adjust slope angle of the elongate workpiece along a longitudinal axis of the workpiece.

The invention further contemplates working apparatus for lifting and positioning successive such sections of elongate workpieces, end to end, and engaging respective ends of adjoining such sections of elongate workpieces. The working apparatus comprises a working vehicle movable along a path following a course along which the elongate workpieces are to be laid in a line, and the above lifting and positioning apparatus mounted to the working vehicle, including a first laser signal receiver receiving an approximately horizontal plane laser signal aligned with a slope of the line of elongate workpieces to be positioned. Second and third laser signal receivers, spaced longitudinally with respect to a centerline of the workpiece being gripped by the grip assembly, receive a rotating vertical plane laser signal parallel to the line of elongate workpieces. The orienting and locating apparatus affects orienting the grip assembly with respective X, Y, and Z axes, the X axis extending in a direction generally along or parallel to the centerline of the workpiece, the X, Y, and Z axes being perpendicular to each other. The control apparatus receives signals from the first, second, and third laser signal receivers, and the first, second, and third level sensors, and determines and sends control signals to one or more of the working vehicle and the lifting and positioning apparatus, thus to bring the center line of the elongate workpiece, gripped in the grip assembly, into vertical and horizontal position, and into axial alignment with the line of elongate workpieces previously laid.

In still other embodiments, the invention contemplates a working implement for lifting and positioning successive sections of elongate workpieces, end to end, and engaging respective ends of adjoining such sections of elongate workpieces. The working implement comprises a mounting assembly for mounting the working implement to a working arm of a working vehicle; a grip assembly for gripping elongate workpieces to be lifted and positioned by the working implement: and orienting apparatus affecting orienting of the grip assembly with respect to respective Y and Z axes of the elongate workplace being gripped by the grip assembly. The Y and Z axes, respectively, are perpendicular to each other. The Y axis extends generally horizontally transverse to a centerline of the workpiece. The Z axis extends upwardly, perpendicular to the longitudinal centerline of the elongate workpiece. First and second vibrators are suspended from the working implement such that respective first and second vibrating elements of the first and second vibrators are disposed at respective locations alongside the implement such that fill material placed alongside the elongate workpiece being held suspended in the grip assembly, at specified grade, slope, and line above an underlying support surface thus to support the elongate workpiece from the underlying support surface, comes into operating contact with the vibrators, whereby vibration of the vibrators assists with consolidating the fill material along the elongate workpiece, thus to support the elongate workpiece from the underlying support surface such that after the consolidation, the elongate workplace can be released from the grip assembly and remain within tolerances of the specified grade, slope, and line, supported from the underlying support surface.

In yet another family of embodiments, the working implement comprises the mounting assembly, the grip assembly, linear displacement apparatus including a linear displacement actuator having a length, the linear displacement apparatus having a linear displacement axis generally parallel to a longitudinal axis of an elongate workpiece being gripped by the grip assembly, and displacing the grip assembly and correspondingly the elongate workpiece along the longitudinal axis of the workpiece, and thereby linearly displacing the grip assembly with respect to the mounting assembly; and orienting and positioning apparatus affecting orienting and positioning of the grip assembly and the linear displacement apparatus with respect to X, Y, and Z axes respectively perpendicular to each other. The X axis corresponds to the linear displacement axis and extends generally parallel to the longitudinal axis of the elongate workpiece being gripped by the grip assembly. The Z axis is an upstanding axis. The orienting and positioning apparatus includes a transverse cross-slope actuator affecting pivoting transverse displacement of the grip assembly along an arcuate path defined by pivoting about the linear displacement axis, thus to move the grip assembly in an arc transverse to the longitudinal axis of the elongate workpiece.

In preferred embodiments, the working implement further comprises support structure between the mounting assembly and the linear displacement apparatus. The linear displacement apparatus comprises 2-way working cylinder apparatus having a ram thereof mounted to the support structure and thereby assisting in linear displacement of the grip assembly with respect to the support structure, and further thereby supporting the grip assembly. The transverse cross-slope actuator is mounted to the support structure and affects pivoting of an outer housing of the working cylinder apparatus about the ram, whereby the pivoting of the grip assembly transverse to the longitudinal axis of the workpiece comprises pivoting of the outer actuator housing with respect to the ram.

Yet further, the invention contemplates a working implement comprising a mounting assembly for mounting the working implement to a working arm of a working vehicle, the mounting assembly including a suspension mounting element, and a control mounting element, a downwardly extending suspension arm and a downwardly extending central longitudinal suspension arm axis; a grip assembly for gripping elongate workpieces to be lifted and positioned by the working implement. The grip assembly, when gripping an elongate workpiece for working manipulation thereof, defines a centerline of the elongate workplace in the grip assembly. The implement further comprises orienting and positioning apparatus affecting orienting and positioning of the grip assembly with respect to respective X, Y, and Z axes, respectively perpendicular to each other. The mounting assembly and the remainder of the working implement, in combination, define a line of suspension extending generally from the suspension mounting element downwardly in a line passing proximate the centerline of the elongate workpiece. The implement still further comprises sensors suitable to establish grade, slope, and line of the elongate workplace gripped in the grip assembly, including a first grade beam (e.g. laser) receiver in a plane containing the central suspension axis and perpendicular to the centerline of the elongate workpiece, for receiving a location signal broadcast specifically along the progressive grade, thus to establish grade of the elongate workpiece along the central suspension arm axis, a second level sensor sensing level orientation of a plane perpendicular to the suspension axis, and thus sensing orientation of the suspension axis in the plane, with respect to a vertical line, third and fourth line beam (e.g. laser) sensors sensing a line beam (e.g. laser) signal defined in an imaginary vertical plane extending along the specified direction, and a fifth level sensor sensing level orientation perpendicular to the centerline of the workplace with respect to a vertical reference line.

In preferred implementations of this family of embodiments the third and fourth line beam sensors assist in establishing the line of the elongate workpiece along the path and direction specified for the line of elongate workpieces.

Yet another family of embodiments contemplates working apparatus comprising a working vehicle movable along a path following a course along which sections of elongate workpieces are to be laid in a line, the working vehicle comprising a working arm having an outer end portion movable with respect to the course, separate from movement of the vehicle, the outer end portion including a machine mounting interface for mounting an implement to the working arm; and a working implement mounted to the working vehicle. The working implement comprises a mounting assembly mounting the working implement to the working arm of the vehicle. The mounting assembly includes a downwardly extending suspension arm and a corresponding downwardly extending central longitudinal suspension arm axis. The implement further comprises a grip assembly for gripping elongate workpieces to be lifted and positioned by the working apparatus, orienting and positioning apparatus affecting orienting and positioning of the grip assembly about respective X, Y, and Z axes, respectively perpendicular to each other. The X axis is in a substantially vertical plane containing a longitudinal centerline of the elongate workpiece being gripped by the grip assembly. The implement still further comprises a first level sensor mounted on the mounting assembly and sensing level orientation of a line in a plane perpendicular to the suspension axis, and thus sensing an angle of the suspension axis in the plane, with respect to a vertical line, and a first actuator responsive to the first level sensor thereby to minimize the sensed angle; a second level sensor operative to sense level orientation of a line parallel to centerline of such elongate workpiece, and a second actuator on the working implement responsive to the second level sensor thereby to establish and maintain a desired slope of a centerline of the elongate workpiece being gripped by the grip assembly; and a third level sensor sensing level orientation of a line transverse to the centerline of the elongate workpiece being gripped in the grip assembly, and a third actuator responsive to the third level sensor thereby to minimize the deviation of the line from horizontal, axes of pivotation of the elongate workpiece corresponding to pivoting movement affected by the second and third actuators being sufficiently close to each other as to approximate a mechanical universal joint.

BRIEF DESCRIPTION OF THE DRAWINGS

FIGS. 6–9 show the 2-way hydraulic linear insertion cylinder, and its mounting in the support structure.

FIG. 10 is a representative pictorial view of the implement, illustrating a three-finger grip assembly, generally in common with the grip assembly shown in FIG. 2.

FIGS. 16–20 illustrate a fifth embodiment of a gripping assembly useful in working implements of the invention.

FIGS. 24 and 25 show a side elevation and a top view respectively of a vertical plane laser transmitter set alongside the trench and pipe line.

Figure 1:
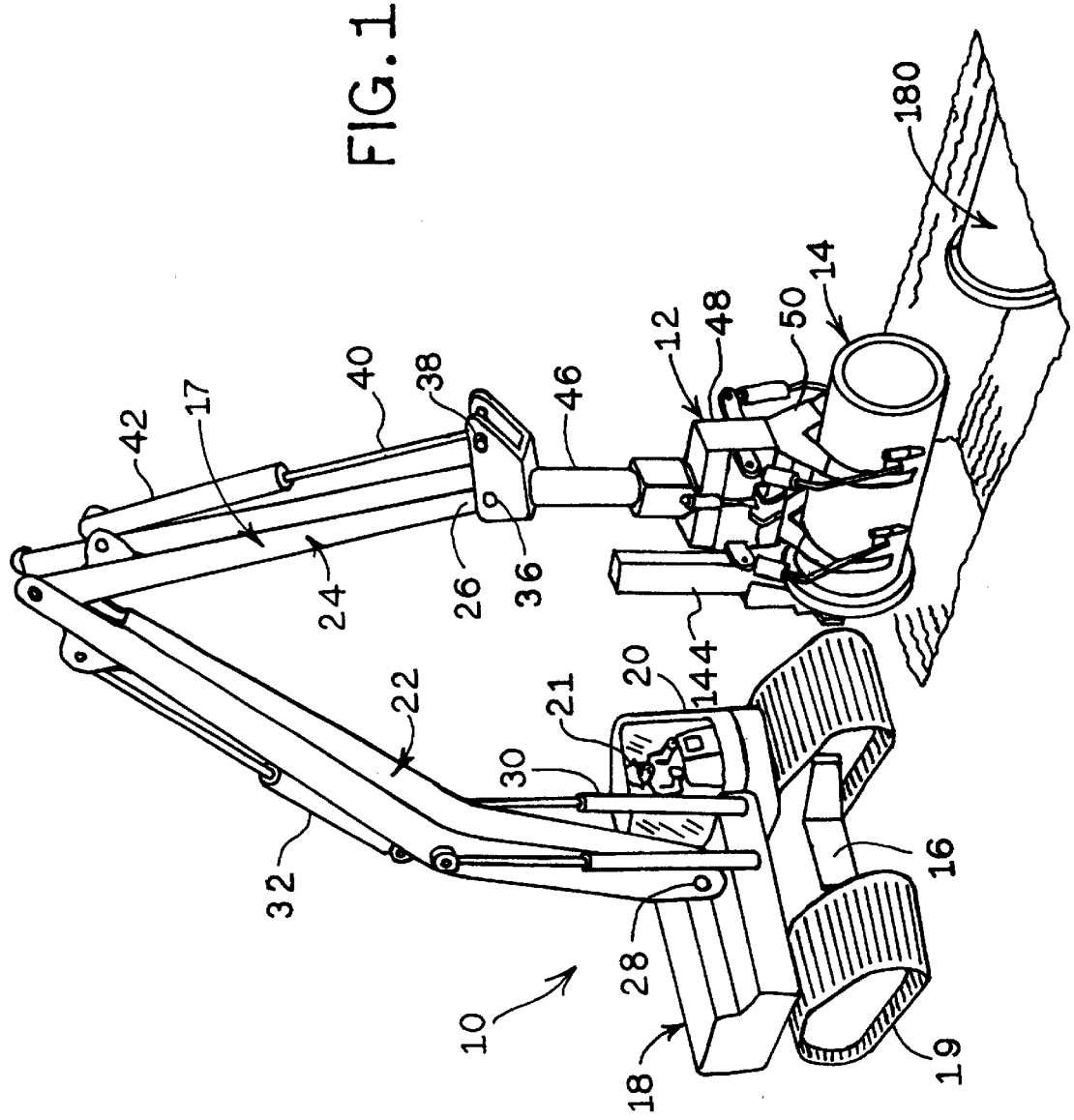
FIG. 1 shows a representative pictorial view of a working machine employing a first embodiment of a working implement of the invention, lifting a pipe section, and placing the pipe section in a trench for engagement with a previously-laid pipe.

The invention is not limited in its application to the details of construction or the arrangement of the components set forth in the following description or illustrated in the drawings. The invention is capable of other embodiments or of being practiced or carried out in other various ways. Also, it is to be understood that the terminology and phraseology employed herein is for purpose of description and illustration and should not be regarded as limiting. Like reference numerals are used to indicate like components.

DESCRIPTION OF THE ILLUSTRATED EMBODIMENTS

Referring to the drawings, FIG. 1 illustrates overall apparatus of the invention. In general, a working machine 10 such as an excavator, a backhoe, power shovel, or other earth moving machine, carries a working implement 12 for lifting and positioning an elongate workpiece 14 such as a section of pipe into aligned engagement with a previously laid pipe section. The combination of the pipe sections is laid along a pre-determined course, thus to create a closed conduit through which water or other liquid will flow when construction of the respective line of pipe has been completed. The combination of machine 10 and implement 12 can also be used to manipulate a wide variety of other elongate workpieces.

The excavating machine 10 generally comprises a base 16 and a collection 17 of extensible working elements. Base 16 includes frame 18, supported on treads 19 or corresponding wheels. Frame 18 generally includes support for conventional engine and drive train, as well as a cab 20 for housing an operator 21 and suitable conventional controls for operating the working machine.

The extensible working elements 17 of such working machine generally include a boom 22, a stick 24, and a working implement such as a bucket at the outer end portion 26 of the stick. The working implement 12 illustrated in FIG. 1 is representative of working implements of the invention which are mounted to the stick at the end portion location where the bucket would normally be mounted.

Machine 10 is illustrated as a backhoe. Boom 22 is mounted for pivotation with respect to frame 18 at pivot point 28. Power for raising and lowering boom 22 is provided through hydraulic cylinders 30, whereby boom 22 is generally used to raise or lower the outer end portion of the stick, and correspondingly to raise or lower the extensible working elements.

Stick 24 is, as usual, mounted for pivotation with respect to the boom, in a plane in common with the pivotation of boom 22 with respect to pivot point 28. Thus, extending and retracting stick hydraulic cylinder 32 pivots stick 24 toward and away from boom 22, and correspondingly toward and away from base 16. As suggested by FIG. 1, stick 24 thus actuates movement of the implement toward and away from boom 22, and correspondingly toward and away from base 16.

Also as illustrated in FIG. 1, the implement is mounted to outer end 26 of the stick by a suspension mounting element such as pin 36, and by a control mounting element such as pin 38. Pin 38 is mounted to the distal end of ram 40 of hydraulic cylinder 42. Extension and retraction of ram 40 generally controls the angle of implement 12 with respect to stick 24.

Conventional use of cylinders 30, 32, and 42 is normally affected in excavation operations such as digging a trench or generally excavating a hole or pit for purposes of a construction project, or wholesale capturing of material such as capturing mineral-bearing material for processing of such material to extract useful products therefrom.

This invention contemplates use of conventional base 16, conventional boom 22, conventional stick 24, and conventional actuating cylinders 30, 32, and 42, in combination with a novel working implement 12. Working implement 12 includes various signaling devices, sensors, and actuators, which are controlled through logic control elements. The logic control elements are generally but without limitation housed in or e or more control panels located in the cab so as to be readily accessible for use by the operator to provide operator input to the logic elements.

By employing conventional actions of boom 22, stick 24, and control cylinder 42, in combination with the novel structure and functions provided by implement 12, the lifting and placing apparatus of the invention efficiently and accurately places pipe sections in engagement in a line of such pipe sections, for example in a trench dug for the purpose of laying such pipe therein such as for gravity flow of water through such line of pipe, as in a sewer line.

The placing contemplated in the invention includes automatically bringing the pipe section to grade, slope, and line. The placing further includes rigidly holding the pipe section suspended above the bottom of the trench at grade, slope, and line while the pipe section is linearly inserted into a previously-laid pipe section, in the trench, and retaining the inserted pipe section in suspended position at grade, slope, and line, while placing fill or bedding material under and around the pipe section, and consolidating the fill or bedding material under and around the pipe section sufficiently that the pipe section can be released from the implement and remain within normal specified tolerances of grade, slope, and line.

By holding the pipe at specified grade, slope, and line while fill material is placed and sufficiently consolidated around and under the pipe, the typical trial and error process of adding or removing fill material in order to achieve a suitable grade, slope, and line is avoided. Thus, once a given pipe section is placed and engaged, and fill material is placed and consolidated about and under the pipe, the process of laying that particular section of pipe is typically complete, and the work can proceed to, for example, placing and engaging the next section of pipe.

By contrast, in conventional practice, the weight of a pipe section is placed on a bed of previously-laid fill material, in anticipation of the previously-laid bed supporting the weight of the pipe section while the pipe section hopefully settles in at specified grade, slope, and line. As previously discussed, even using skilled workers, the ability to predict the affect of the pipe on especially grade and slope, and thus to properly prepare the bed of fill material, is inconsistent at best.

Accordingly, the novel process of holding the pipe section suspended at desired grade, slope, and line while placing and consolidating fill material under and around the pipe section greatly simplifies the process of placing and engaging the pipe section, as well as making it possible to hold tighter tolerances for at least one, preferably all, of grade, slope, and line.

Turning now to a description of implement 12, attention is directed generally to FIGS. 2–9. As illustrated in FIGS. 2–5, the mechanical portions of implement 12 can generally be discussed in terms of mounting assembly 46, support structure 48, and grip assembly 50.

The Mounting Assembly

Figure 2:
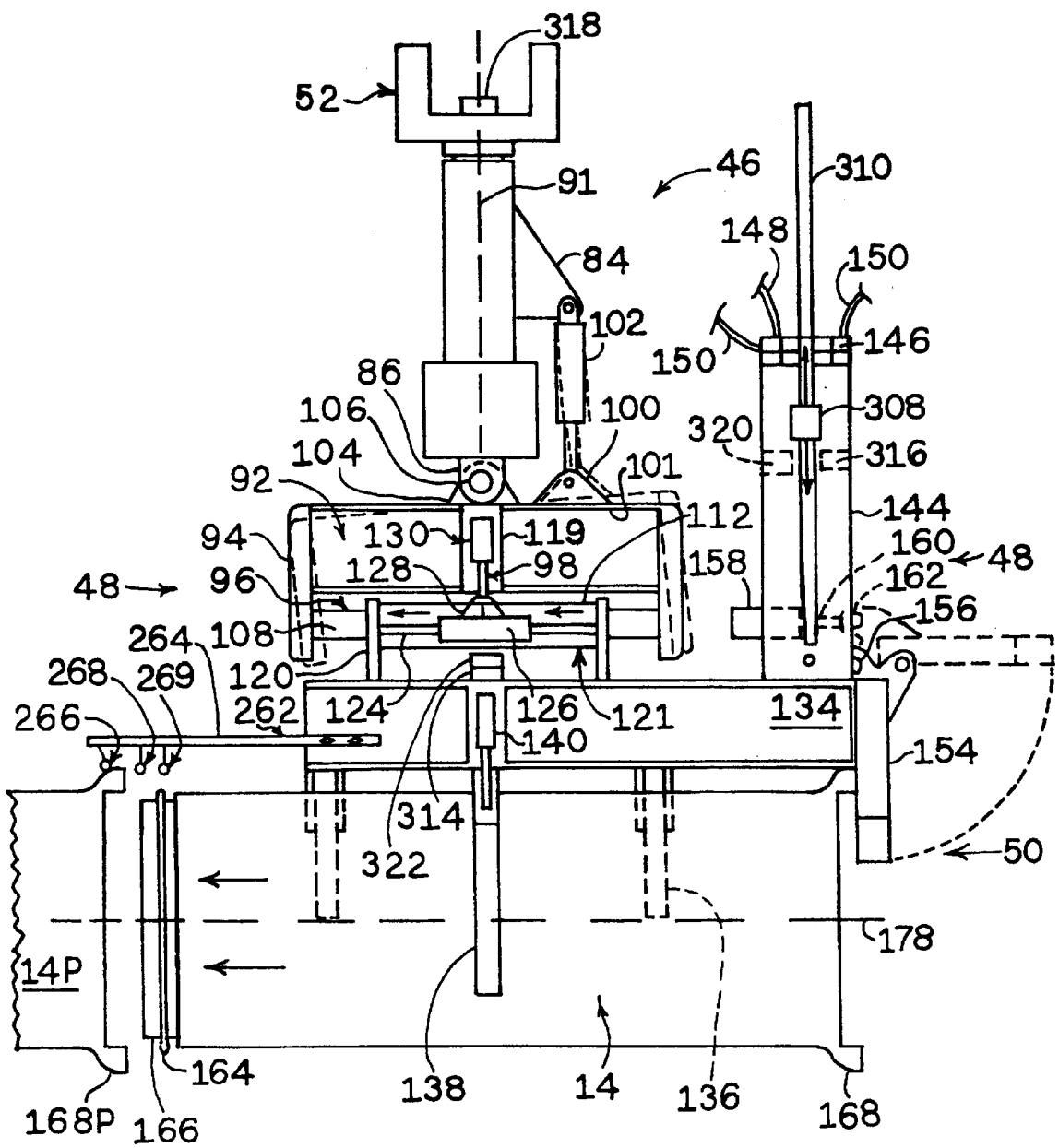
FIG. 2 shows a representative front elevation view of a second embodiment of the working implement, gripping a pipe section, including the mounting assembly, support structure mounted to the mounting assembly, and grip assembly mounted to the support structure.
Figures 4, 5:
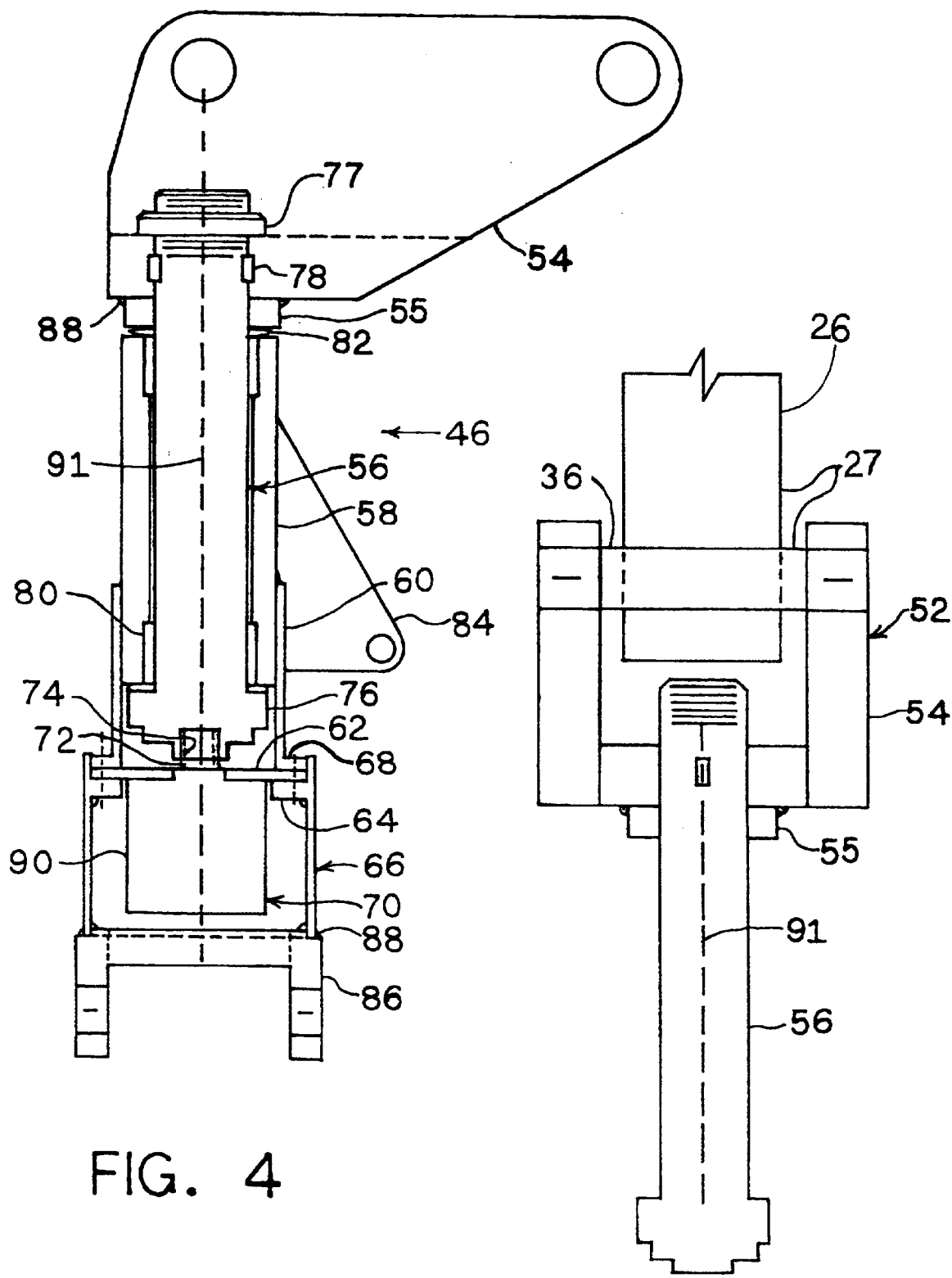
FIG. 4 shows an elevation view of the implement mounting assembly.
FIG. 5 shows an elevation view of coupling of the machine interface with the implement interface, as well.

Referring to FIGS. 2, 4, and 5, mounting assembly 46 includes an implement mounting interface 52 generally defining a yoke 54 and an adapter 55. A corresponding machine mounting interface 27 is generally comprised of the outer end portion of stick 26 and suspension mounting pin 36. A downwardly extending suspension arm 56 extends downwardly from yoke 54. Suspension arm 56 is received in receiving tube 58 which is supported by sleeve 60. Sleeve 60 is supported by underlying mounting disc 62 and by flange 64 of housing 66. Sleeve 60 further includes flange 68 aligned with flange 64 of housing 66. Suitable fasteners, not shown, such as screws, bolts, or the like extend through flanges 64 and 68, and thus through mounting disc 62, securing the mounting disc to both sleeve 60 and underlying housing 66.

Rotary actuator 70 is a hydraulic vane type rotary actuator, physically mounted to disc 62 by suitable fasteners such as machine screws, not shown. Rotary actuator 70 includes upwardly extending male drive gear 72. Male gear 72 extends into female gear 74 in flange 76 of suspension arm 56. Suspension arm 56 is secured between yoke 54 and receiving tube 58 by threaded nut 77 in combination with abutment of flange 76 against the bottom of receiving tube 58. Keys 78 and respective slots in yoke 54 and suspension arm 56 retain suspension arm 56 against rotation with yoke 54. With suspension arm 56 thus secured in suspension, female gear 74 receives male gear 72 without male gear 72 bearing the weight of suspension arm 56 or yoke 54.

Bearings 80 provide bearing surfaces between suspension arm 56 and outwardly disposed receiving tube 58, thus to keep the suspension arm centered in receiving tube 58.

A thrust washer 82 provides a seal and bearing interface between adapter 55 and the top of receiving tube 58. As illustrated in FIGS. 2 and 4, a cylinder mounting flange 84 extends outwardly from receiving tube 58 and sleeve 60. Yoke 86 is mounted to a lower surface of housing 66. Welds 88 are illustrated at various locations in mounting assembly 46 to indicate permanent joiner of respective elements to each other to make permanent subassemblies.

Accordingly, the mounting assembly can be opened at the interface of flange 68 and disc 62 by removing the fasteners securing flange 68 and disc 62, whereupon for example, receiving tube 58, sleeve 60, along with implement mounting interface 52 and respective bearings 80, 82 can be removed from the actuator and actuator housing, such as for servicing of actuator 70. In addition, yoke 54 can be separated from suspension arm 56 by removing nut 77.

Given the above description of structure, when hydraulic actuator 70 is activated, torque applied between the actuator body 90 and male gear 72 causes rotation between gear 72 and the actuator body. Since yoke 54 is rigidly mounted to the excavating machine at outer end portion 26 of the stick, the implement as mounted at yoke 54 at all times moves as one with movement of end portion 26 of the stick. When the end of the stick does not move, neither does the implement at large move. Thus, suspension arm 56 and gear 72 remain relatively as stationary as end portion 26 of the stick while actuator body 90 rotates with respect to gears 72, 74. As actuator body 90 rotates, disc 62, actuator housing 66, lower yoke 86, sleeve 60, and receiving tube 58 also rotate. Thus, the activation of actuator 70 causes rotation of lower yoke 86 with respect to upper yoke 54. A typical such rotary actuator enables yoke 86 to rotate in a 280 degree arc in relation to yoke 54. The purpose of such rotation is to enable the operator to align pipe to the left or right of the plane of the boom and stick, thus to lay pipe in a trench aligned across the plane of the boom and stick.

Figure 3:
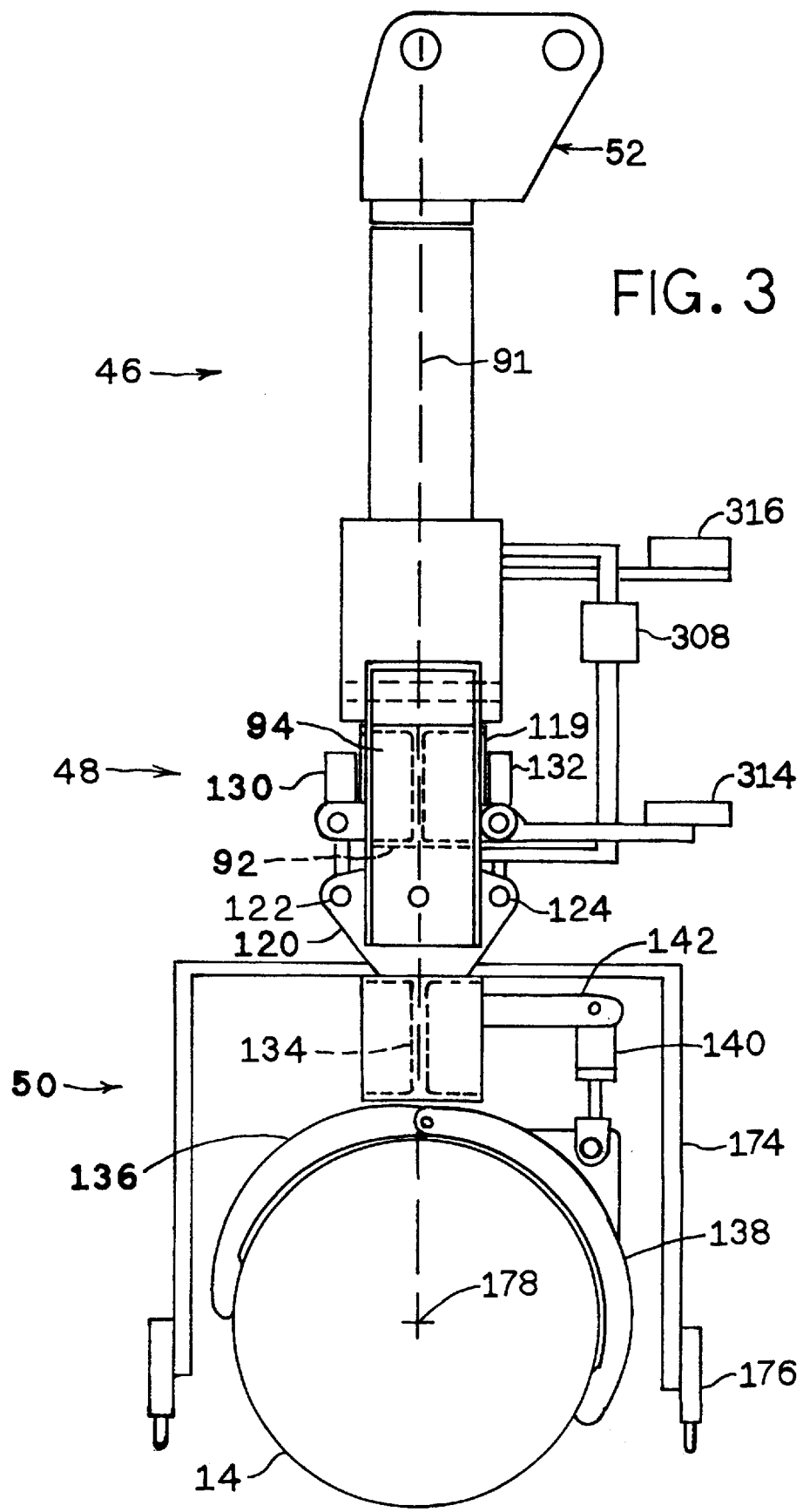
FIG. 3 shows a side elevation of the embodiment of FIG. 2.

FIG. 3 illustrates the centerline 178 of pipe section 14 in alignment with centerline 91 of suspension arm 56. The weight of implement 12 and pipe section 14 passes through suspension arm 56. Suspension arm 56, and especially the centerline of suspension arm 56, is thus treated as a suspension axis through which the forces traversing between yokes 54 and 86 act. Accordingly, centerline 91 acts as a suspension axis between suspension element pin 36 and pipe axis 178.

The Support Structure

We refer now to FIGS. 2 an 3, as well as to FIGS. 6–9, for illustration of support structure 48. Support structure 48 generally comprises a structural I-beam 92, channel iron end caps 94, linear displacement apparatus 96, and transversely cross-oriented slope displacement apparatus 98. Cylinder flange 100 extends upwardly from top flange 101 of I-beam 92. Slope hydraulic cylinder 102 extends between cylinder flange 84 on mounting assembly 46 and cylinder flange 100 on the support structure, thereby to enable pitching movement of support structure 48 with respect to mounting assembly 46 as illustrated by dashed outline in FIG. 2. In the illustrated embodiment, support structure 48 can be pitched or sloped by 15 degrees up and 15 degrees down, with respect to a null, or horizontal, starting position, providing for 30 degrees of pitching movement overall. The apparatus shown here can be modified as desired to achieve greater or lesser ranges of pitch movement.

Suspension support flange 104 extends upwardly from a central portion of upper flange 101 of I-beam 92 and is pivotally mounted to lower yoke 86 of the mounting assembly at pivot pin 106. Thus, activation of slope cylinder 102 causes pitching movement of support structure 48 with respect to mounting assembly 46 as shown in dashed outline in FIG. 2. Similarly, activation of rotary hydraulic actuator 70 causes rotation of support structure 48 with respect to upper yoke 54, through the mounting at yoke 86 and flange 104.

Referring now to FIGS. 6–9, two-way ram 108 is mounted to end caps 94 by bearings 109 and by bolts 111 which extend into bolt holes 110. Bearings 109 mount ram 108 to end caps 94, through bolts 111 and bolt holes 110. Cylinder housing 112 and end closures 114 enclose ram 108. Hydraulic fittings 115 provide for flow of hydraulic fluid into and out of opposing fluid cavities 116, 118 between ram 108 and housing 112. Suitable fluid seals, not shown, are positioned between cavities 116, 118 to prevent hydraulic fluid from flowing directly between cavities 116 and 118 inside housing 112. Overall, ram 108, cylinder housing 112, end closures 114 define a double rod balanced type, double acting hydraulic homing cylinder 121.

Grip assembly supports 120 extend downwardly from opposing ends of cylinder housing 112, and provide support to underlying grip assembly 50. Opposing parallel slide shafts 122, 124 extend between the two grip assembly supports 120 on opposing sides of ram 108 and are rigidly mounted to supports 120. Cross-slope housings 126 extend about slide shafts 122, 124. Upper cross-slope cylinder brackets 119 are mounted on opposing sides of I-beam 92. Lower cross-slope brackets 128 extend upwardly from cross-slope housings 126. Opposing cross-slope cylinders 130, 132 are mounted to upper and lower cross-slope cylinder brackets 119 and 128. Cylinders 130, 132 operate in an opposing manner thereby forming a balanced hydraulic circuit. The purpose of cylinders 130, 132 is to control cross-slope positioning of the pipe section being held in grip assembly 50. As cylinders 130, 132 move cross-slope housings 126 cooperatively up and down, the grip assembly moves in an arcuate path, centered on the centerline of 2-way ram 108. Such transverse cross-slope movement of the grip assembly supports is illustrated in FIG. 8.

Figure 13:
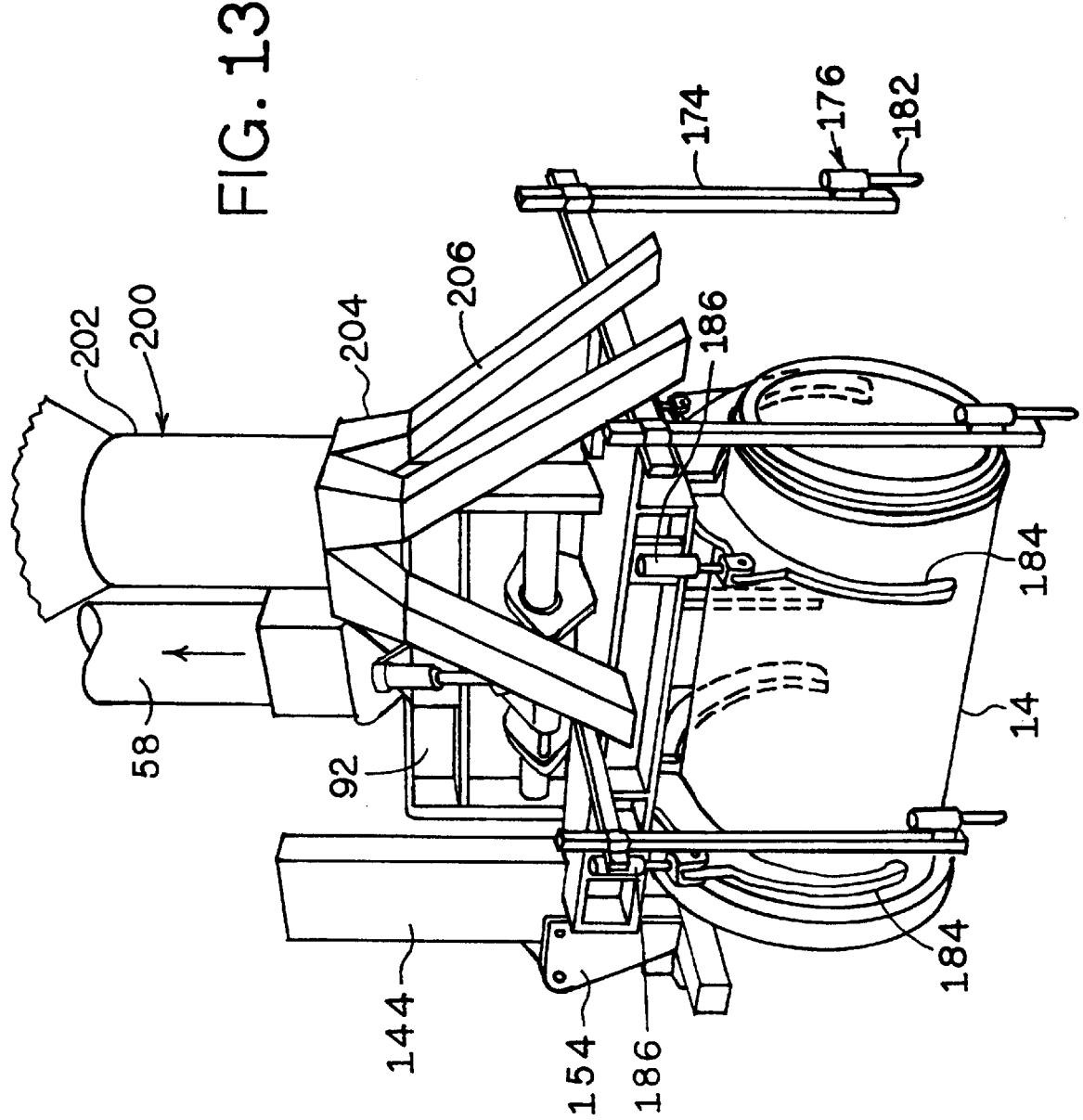
FIG. 13 is a representative pictorial view of the implement illustrating the location and structure of the fill distribution system.

Support structure 48 also supports a fill material distribution system 200 illustrated in FIGS. 10 and 13. Distribution system 200 includes hopper 202, a manifold 204, and a plurality of distribution chutes 206. Hopper 202 receives fill material such as crushed rock, gravel, or the like, from a material supply source such as a conveyor or auger equipped supply truck. The fill material flows from the hopper into manifold 204 which separates the fill material flow into approximately equal parts. The bottom of manifold 204 terminates in four flanged chutes. A first pair of chutes conveys the fill material to positions above opposing sides of the joint currently being formed between the pipe being held in the implement and the end one of the previously laid pipe sections. The second pair of chutes conveys the fill material to positions above opposing sides of approximately the mid-point of the pipe section being held in the implement.

The Grip Assembly

Referring to FIG. 2, grip assembly 50 includes lower I-beam 134, a pair of grip stops 136 extending downwardly below the far side of I-beam 134, and grip finger 138 extending downwardly below the near side of I-beam 134. Grip stops 136 are fixedly and preferably rigidly mounted to I-beam 134, and serve as stops for gripping a pipe section when grip finger 138 is moved toward the grip stops.

Figure 11:
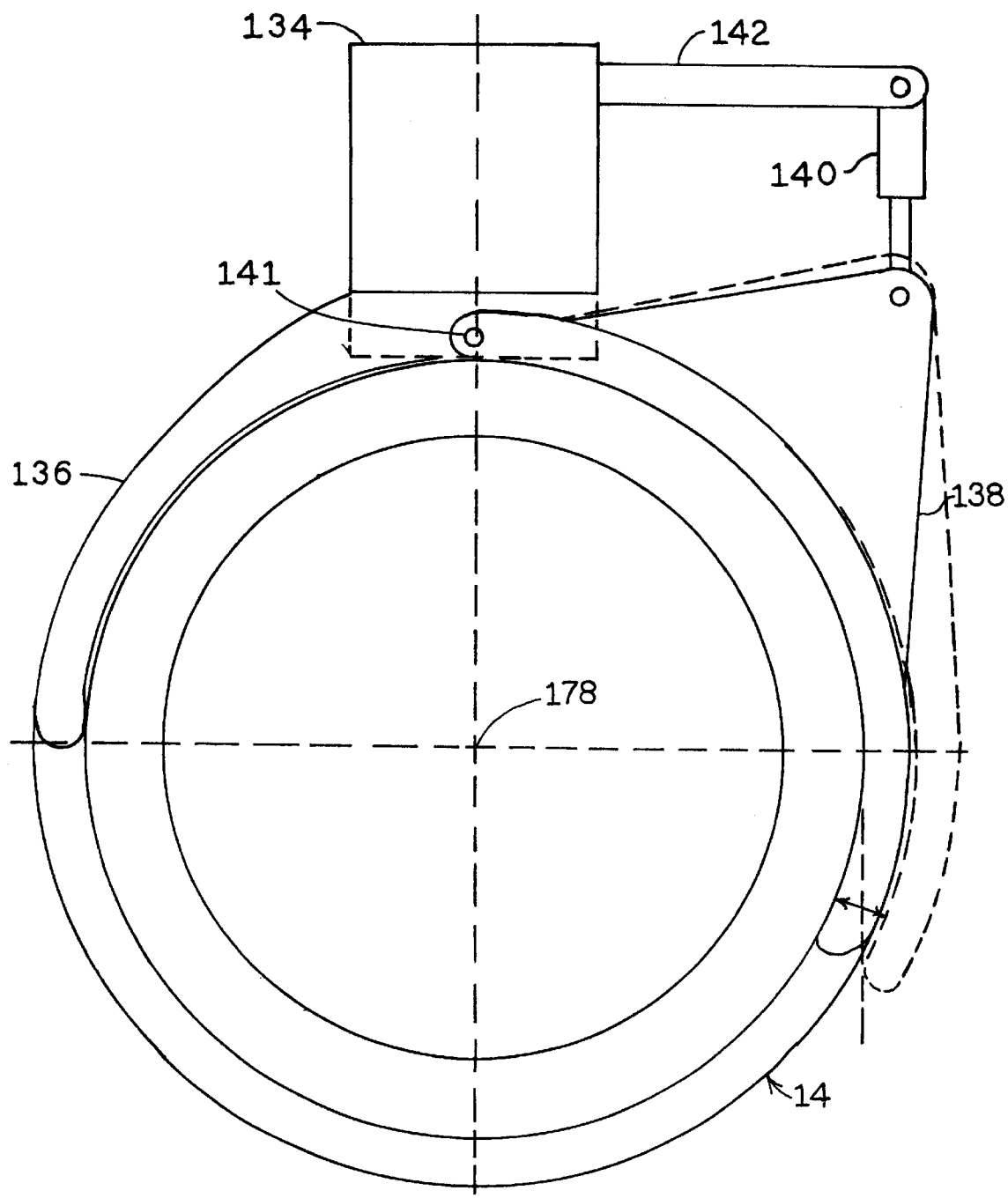
FIG. 11 is an enlarged modified representative end view of the grip assembly of FIG. 11, showing the relationships of gripping elements with respect to the pipe section.
Figure 12:
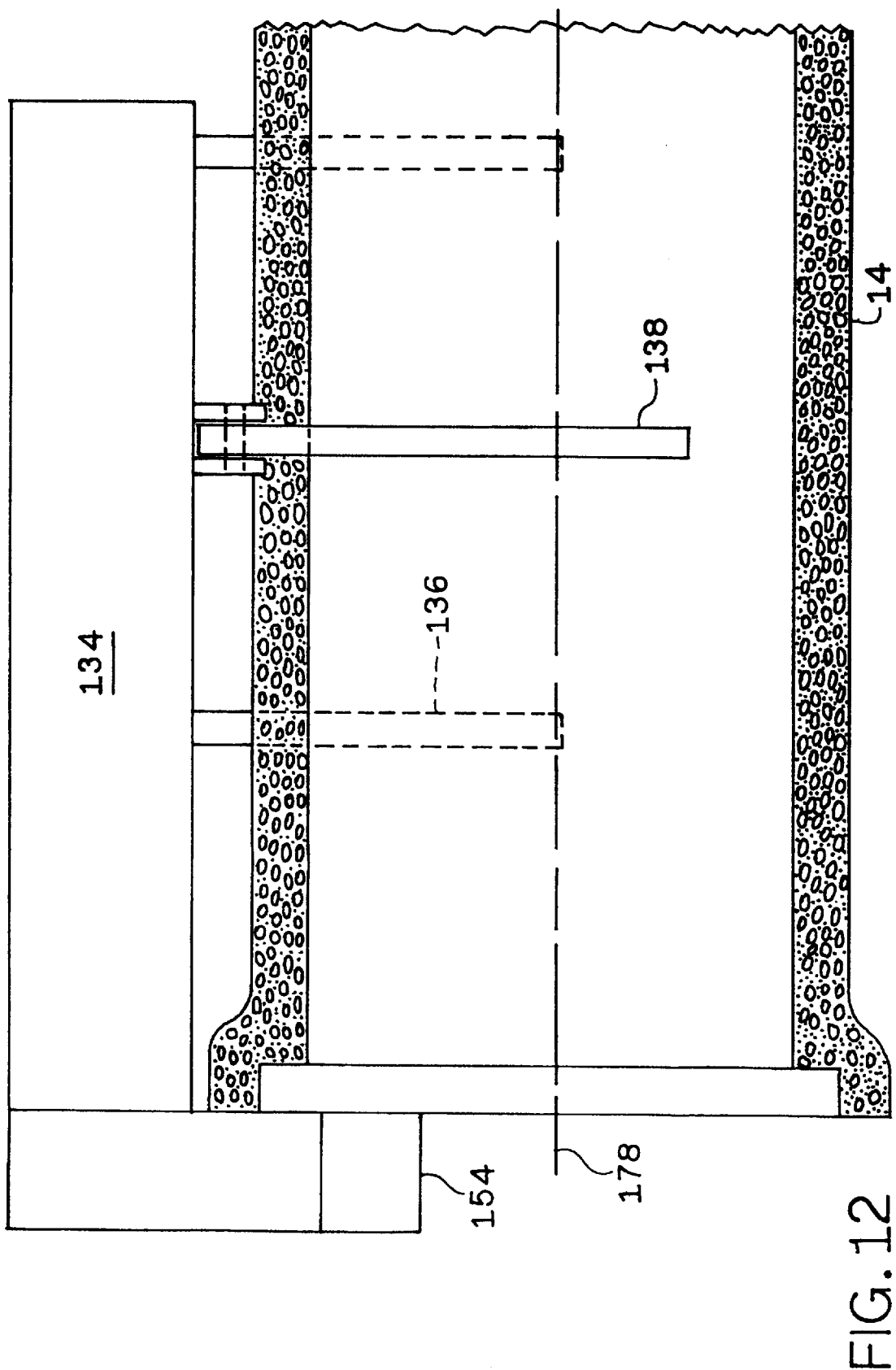
FIG. 12 is an enlarged representative front elevation view of the pipe section and gripping element of FIG. 11, showing the pipe in cross-section.

Grip finger 138 is mounted to I-beam 134 by suitable bracket and pivot pin 141 (FIG. 11), for pivotation about an axis extending parallel to the length of I-beam 134. A grip finger cylinder 140 extends from bracket 142, rigidly mounted on the side of I-beam 134, to a suitable mount locus on grip finger 138, whereby activation of cylinder 140 moves finger 138 toward and away from grip stops 136. As illustrated in FIGS. 2 and 11, movement of finger 138 toward and away from grip stops 136 correspondingly moves the finger toward and away from a pipe section 14 to be gripped, or being gripped, by grip assembly 50.

As illustrated in FIG. 10, a cross-bar 143, in combination with contact pads 145, can be used to apply the grip force of grip finger 138 to the pipe section at any desired location along the length of the pipe. Thus, as shown in FIG. 10, a pair of pads 145 at opposing ends of cross bar 143 can apply gripping force to the pipe section at locations generally opposing grip stops 136. If desired, a third pad, not shown, can be positioned directly inwardly toward the pipe section from finger 138.

Mast 144 extends upwardly from I-beam 134. Hydraulic values 146 which operate actuation on implement 12 are located at or adjacent the top of mast 144.

Hydraulic lines to and from valves 146 and various ones of the hydraulic actuators, and other controls, are not shown in the drawings, the conventional use of such hydraulic tubing being understood. The advantage of having the valves on mast 144 is that the distance between the valves, and the dust and dirt about the grip assembly, is great enough that the valves need not be covered to protect them from the dust and dirt of the construction site. Valves 146 are supplied with high pressure hydraulic fluid from machine 10 through a single pair of hydraulic lines, namely a supply line 148 and a return line 150. Control commands are supplied from control units in cab 20 to hydraulic valves 146 through a single electrical or other suitable control cable 152.

Homing stop 154 is a "T"-shaped bar, mounted to I-beam 134 by a suitable bracket (not shown), pivot pin 156, and hydraulic cylinder 158. Cylinder 158 is mounted to mast 144. Ram 160 of cylinder 158 is mounted to homing stop 154 by pivot pin 162. Cylinder 158 actuates an over-center type linkage providing a positive lock in the down position thus to prevent external forces from overcoming the hydraulic cylinder.

When the operator of excavating machine 10 brings implement 12 proximate the respective workpiece, he lowers grip assembly 50 down over the pipe section and moves implement 12 along the length of the pipe section, as necessary, toward the spigot end, preferably until the "T"-bar comes into abutment with the bell end of the pipe section. If the "T"-bar is not in direct contact with the bell end of the pipe section when the pipe section is picked up, the pipe section will slide along finger 138 and stops 136 into an abutting position with the "T"-bar when the spigot end of the pipe section receives resistance from the bell end 168P of the previously laid pipe section, for example pipe section 14P in FIG. 2, at engagement of the spigot into the bell of the previously laid pipe section.

Extension and retraction of ram 160 raises and lowers homing stop 154 as illustrated in FIG. 2. When the homing stop is in the lowered position shown in FIG. 2, the homing stop generally abuts a pipe section 14 being gripped by grip assembly 50, at least by the time the bell end of the previously laid pipe exerts a resisting pressure to routine insertion of a new pipe section into a previously-laid pipe of a previously laid segment of the line of pipe. Thus, it is not critical to the invention that the homing "T"-bar be raised from the lowered, working position. Accordingly, in some embodiments, the "T"-bar is permanently and immovably secured in the illustrated "down" orientation.

Referring again to FIG. 2, mast 144 is mounted to and extends upwardly from I-beam 134 of the grip assembly, and carries a variety of utility structures which assist in operation of implement 12. At the upper end of mast 144 is a bank 146 of hydraulic valves which control flow of hydraulic fluid to the several cylinders and other controls on implement 12, such as the vibrators, described hereinafter. Typical such hydraulic valves are proportional and direct hydraulic control valves. Which valve type will be determined by the use for which the specific valve is to be employed. Thus, proportional valve assemblies control hydraulic actuator 70, slope cylinder 102, cross-slope cylinders 130, 132, and homing cylinder 121. Direct hydraulic control valves control grip finger 138, vibrators 176, and movement of homing stop 154.

Referring again to FIG. 10, a vibrator frame, generally designated 170, is mounted to lower I-beam 134 above the upper flange of I-beam 134. Spigot and bell end vibrator frame cross members 172S and 172B extend in a direction transverse to the length of I-beam 134, and thus transverse to the length of pipe section 14. Bell end cross member 172B extends across I-beam 134 at approximately the mid-point of the length of the pipe section being carried by implement 12. Spigot end cross member 172S extends across I-beam 134 past the end of the I-beam, and at a locus that will position cross member 172S above the previously laid pipe section 14P, and generally between the bell and the mid-point of the length of the previously laid pipe section.

Four downwardly depending vibrator frame legs 174 are secured to cross members 172B, 172S generally at opposing ends of the respective cross members. Four hydraulic powered vibrators 176, such as are commonly used in vibrating fluid cement during pouring and setting of such cement, are mounted to legs 174 at heights generally below centerline 178 of pipe section 14 being gripped by grip assembly 50, and above the bottom of the pipe section. At that height, fill material placed around the pipe section, as the pipe section is being placed and engaged in the line 180 of pipe sections, comes into contact with vibrating elements 182 of the vibrators. Vibrators 176 are powered through hydraulic lines, not shown, fed from respective ones of valves 146. Vibrators 176 are activated by the machine operator when fill material is being fed through distribution system 200.

Cross members 172B and 172S are adjustable in length thus to provide for moving legs 174 toward or away from pipe section 14 in order to achieve the proper amount of vibration in the fill material adjacent the pipe section. For use with a given size pipe section, the distance between respective legs 174 mounted to cross member 172B and to cross member 172S is generally greater than the diameter of the pipe section to be gripped by grip assembly 50. Correspondingly, the distance between the vibrator legs is small enough to place the vibrators adjacent the sides of the respective pipe sections.

Similarly, legs 174 are adjustable in length so as to provide for vertical adjustment of the positioning of vibrators 176. Typically, vertical positioning of the vibrators is such that vibrator elements 182 are between the height of the centerline of the pipe section and the bottom-most surface of the pipe section.

It will be appreciated that the effectiveness of vibrators 176 in assisting the settling and other consolidation of particulate fill material such as gravel about the pipe sections depends on, among other things, contact between the respective vibrating elements 182 and the fill material, as well as proximity of the vibrating elements to the sides of the pipe sections about which the fill material is being placed and consolidated. The effectiveness of the vibration to consolidate the fill material also depends in part on the number of vibrators used. While as few as 2 vibrators is helpful, typically at least 4 vibrators are used. While 4 vibrators are typically adequate, more vibrators can be used if desired.

It will be further appreciated from the above description that the placement of the vibrators is such as to vibrate fill material at generally the mid-point of the pipe section being placed, and at or adjacent the spigot end/bell end joint of the pipe section being laid with the previously-laid pipe section or optionally further toward the mid-point of such previously laid pipe section.

In some embodiments, consolidation and settling of the particulate fill material can be somewhat enhanced by moistening the fill material and/or otherwise employing liquid to enhance transmission of the vibration energy through the fill material. Indeed, the fill material may be added as a thick slurry. However, any such amount of added water used to assist the vibrators is generally small enough that water is not left standing in the trench above the top of the fill material.

In addition to the above noted proportional and direct hydraulic valves, and the noted hydraulic cylinder connections, grip assembly 50 also carries various electronic and electric devices, as well as the above noted vibrator frame 170.

FIGS. 13–20 illustrate alternate grip assemblies. In FIG. 13, grip stops 136 and grip finger 138 have been replaced by 2 pairs of opposing grip fingers 184. Grip fingers 184 are generally configured, and mounted to I-beam 134, in accord with the configuration and mounting of grip finger 138 of e.g. FIG. 2. Thus each grip finger is pivotally mounted to I-beam 134, and is actuated to pivot about a pivot pin adjacent I-beam 134, thus to move the distal ends of fingers 184 toward or away from the pipe section, by respective hydraulic cylinders 186. Typically all of the grip fingers are actuated together for simultaneous gripping or releasing, in common, of the pipe section.

Figure 14:
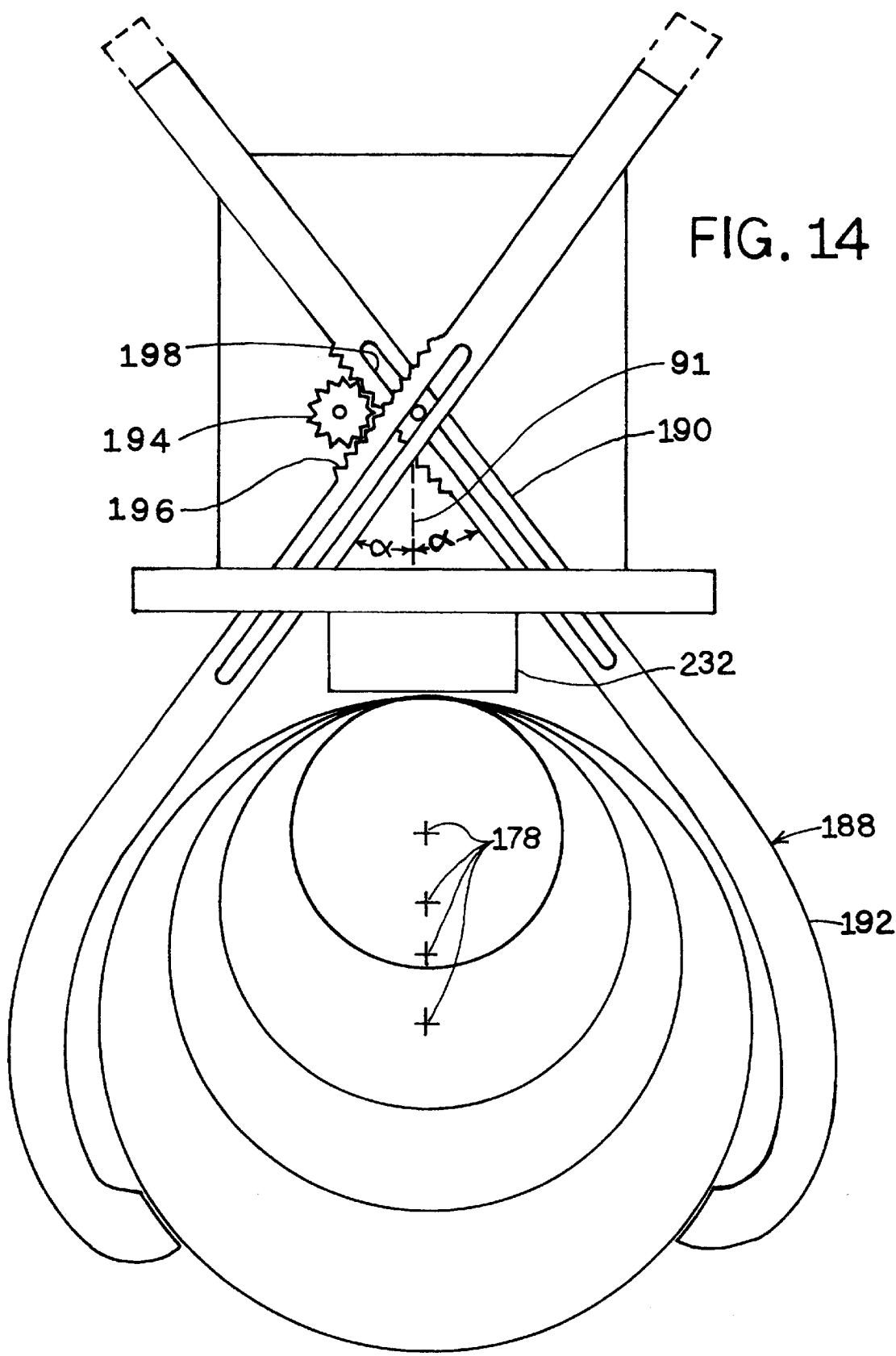
FIGS. 14 and 15 are end views illustrating third and fourth embodiments of gripping elements of the implement.
Figure 15:
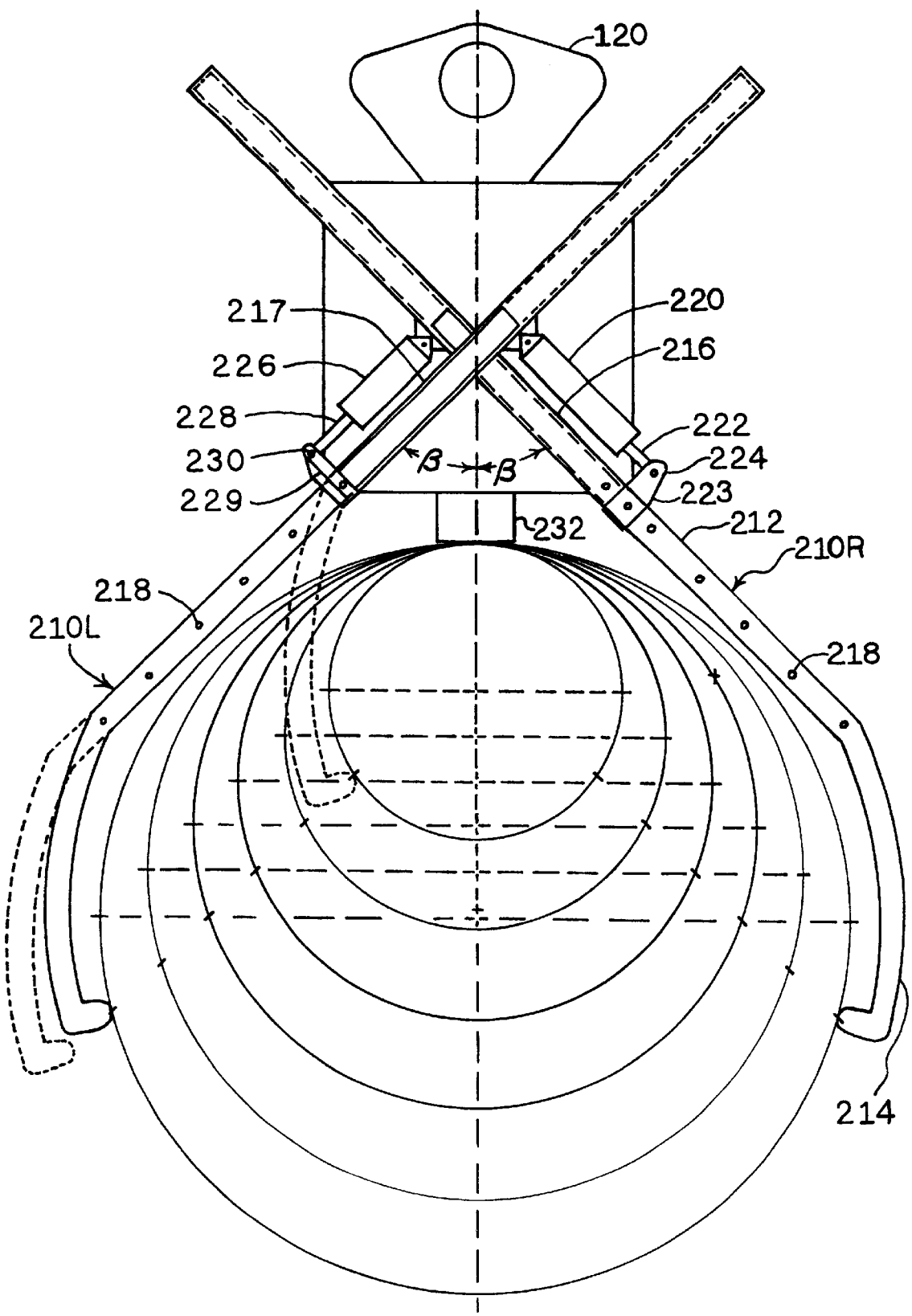
Figure 20:
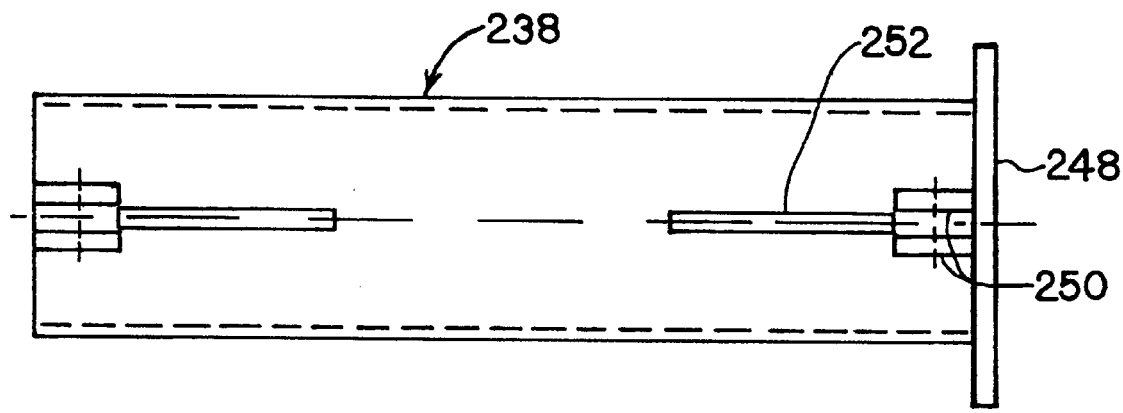

FIGS. 14 and 15 illustrate further 4-finger grip assemblies. In each of FIGS. 14 and 15, the respective pairs of grip fingers are mounted to an upper frame corresponding to I-beam 134, and are generally arranged in opposing relationship on opposing sides of the respective grip assemblies. Referring now to FIG. 14, each finger 188 has a straight extending section 190 and a curved or angled gripping section 192. Fingers 188 are set at angles α of about 30 degrees to about 50 degrees with respect to suspension axis 91. Elongate pinion gear 194 extends between the pairs of fingers, and simultaneously interacts with rack gears 196 on all 4 of fingers 188. Correspondingly, actuation of pinion gear 194 causes simultaneous extension or retraction of all four of fingers 188. Slots 198 direct, confine, and guide sliding longitudinal movement of fingers 188.

In FIG. 15, each finger has a straight extending section 212 and a curved or angled gripping section 214. Thus, right side fingers 210R and left side fingers 210L are respectively set at angles β of about 45 degrees with respect to suspension axis 91. Each of the two fingers 210R is received in a respective elongate guide channel 216. Each of the two fingers 210L is received in a respective elongate guide channel 217. It will be understood that each of fingers 210L and 210R in the illustration of FIG. 15 represents both the bell-end finger and the spigot-end finger. Channels 216 and 217 direct, confine, and guide sliding longitudinal movement of respective ones of fingers 210R, 210L.

Fingers 210R, 210L contain adjustment mounting apertures 218 spaced at even intervals along respective straight sections 214. Apertures 218 are spaced at intervals of, for example, 4 inches. Actuation cylinders 220 are mounted to respective guide channels 217 and the distal ends of rams 222 are mounted to fingers 210R, through collars 223, using respective pins 224 and 225. Actuation cylinders 226 are mounted to respective guide channels 216 and the distal ends of rams 228 are mounted to fingers 210L, through collars 229, using respective pins 230 and 231.

Each cylinder 226 has a maximum ram extension of 4 inches, corresponding to the distance between apertures 218. Thus, the maximum distance of travel of an arm 210L, between maximum extension of the respective ram 228 and full retraction of the same ram 228 is four inches. The maximum distance of ram extension is preferably the same as the distance between the apertures. Further, the specific locations of apertures 218 with respect to the corresponding cylinders 226 are set to correspond with standard diameters of pipe sections, such that, as fingers 210R and 210L are retracted against the pipe section of the corresponding size, the pipe section will be firmly gripped against top abutment 232 when collars 229 abut the lower ends of guide channels 217.

Each cylinder 220 has a maximum ram extension of about 5 inches, which is greater than the distance between apertures 218 and greater than the range of cylinder 217. Thus, the maximum distance of travel of an arm 210R, between maximum extension of the ram and full retraction of the ram 222, is about five inches. The maximum distance of ram extension is thus greater than the distance between apertures 218, and is also greater than the maximum extension of ram 228. Thus, when cylinders 220 and 226 are simultaneously retracted, from full extension against a pipe section, collar 229 abuts channel 217 at about the time the pipe section abuts abutment 232, while ram 222 has about 1 inch of retraction range remaining. The result of such geometry is that collar 229 is seated firmly against guide channel 217, pipe section 214 is abutting abutment 232, and cylinder 220 is actively urging finger 210R against the pipe section, thus dynamically holding the pipe section against finger 210L and abutment 232.

FIGS. 16–20 illustrate yet another embodiment of grip assembly 50. As seen in FIG. 16, I-beam 134 supports downwardly extending mounting beam 234 which supports a pig assembly 236. Pig assembly 236 is illustrated in its expanded state, supporting pipe section 14 at the inside surface of pipe section 14.

Pig assembly 236 includes a support tube assembly 238, a pair of support discs 240, three actuator assemblies 242 mounted to each of the support discs, and actuation cylinder 244 extending between the support discs.

Support tube assembly 238 includes a tube 246, an end flange 248, and three circumferentially spaced pairs of collar brackets 250 at each end of tube 246. Longitudinally extending slots 252 extend through the thickness of the side wall of tube 246 adjacent respective ends of the tube and centered behind each of the pairs of collar brackets 250.

Each of actuator assemblies 242 includes an ear 254, an engagement arm 256, and a pivot strap 258. Ear 254 is mounted to the respective disc 246, such as by a pair of bolts, to extend outwardly from the respective locus of mounting, through a respective slot 252. A pivot pin, not shown, mounts an engagement arm 256 to the distal end of ear 254 so the respective engagement arm 256 can pivot with respect to ear 254. Pivot strap 258 is mounted for pivotation at opposing ends thereof to engagement arm 256 and to collar brackets 250.

As suggested by FIG. 17, there are three slots and three collar bracket pairs at each end of tube 238. Each disc 240 supports three actuator assemblies 242. whereby three engagement arms 256 extend outwardly to engage the inner surface of the pipe section from each end of the pig.

Figure 19:
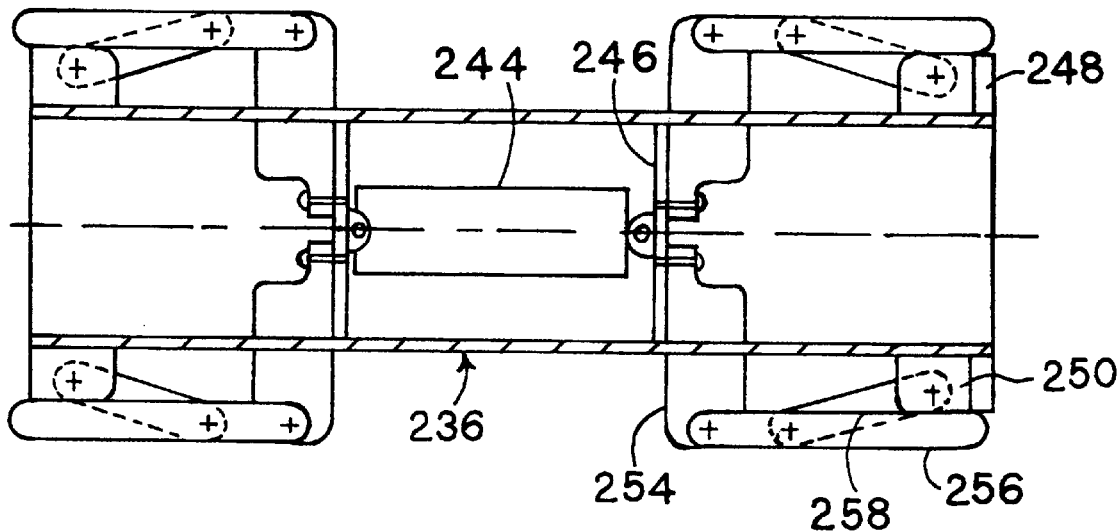

Actuation cylinder 244 is mounted inside tube 246 between discs 240. FIG. 19 illustrates the pig assembly in its collapsed configuration such as when the pig assembly is inserted into a pipe section, mounted on mounting beam 234. In the collapsed configuration, ram 260 is in its fully retracted position, and engagement arms 256 are fully retracted against collar brackets 250.

After the pig is inserted into the pipe section, generally from the bell end. ram 260 is extended. As ram 260 is extended, it pushes discs 240 outwardly toward the respective ends of tube 246. As discs 240 move outwardly, ears 254 push against arms 256, resisted by straps 258, raising the distal ends of engagement arms 256 into engagement with the inside surface of pipe section 14. The secure engagement of the engagement arms 256 against the inner surface of the pipe section secures the pig to the pipe section, whereby the pipe section can be lifted, positioned, and oriented in the manner described herein generally for implements of the invention.

Referring to valves 146 on mast 144, for illustration purposes only, valve #1 powers rotary actuator 70, and thus controls 280 degree rotation of yoke 86 with respect to yoke 54. Valve #2 feeds slope cylinder 102 and thus controls the slope of pipe section 14. Valve #3 feeds the cross slope cylinders 130, 132, and thus controls the cross-slope positioning of the pipe section. Valve #4 feeds homing cylinder 151 and thus controls insertion of the spigot end of pipe section 14 into the bell end of the previously-laid pipe section. Valve #5 feeds the hydraulic cylinders which control the gripping fingers on the spigot end of the grip assembly.

Valve #6 feeds the hydraulic cylinders which control the gripping fingers on the bell end of the grip assembly. Valve #7 feeds cylinder 158 and thus controls the up and down position of homing stop 154. Valve #8 feeds the vibrators 176 which are on the right hand side of the pipe section while valve #9 feeds the vibrators 176 which are on the left hand side of the pipe section. Valve #10 is a spare.

The inventors contemplate that implement 12 is useful to lift and place pipe sections equivalent in difficulty and weight to a 72 inch diameter concrete pipe, weighing up to e.g. 6 Tons. If the size limit is violated, the grip elements may need to be redesigned to accommodate size. If the weight limit is violated, the implement structure may need to be strengthened in order to safely lift such pipe sections.

Homing a pipe section refers to engaging e.g. the spigot end of the respective pipe section, being manipulated, with the bell end of the previously laid pipe section, thus to bring the pipe sections together to join the respective pipe sections thereby to so form a joint of such pipe sections.

Referring to the above discussion of controls and control functions, all of the sensors and signal receivers can be operated manually, and certain ones of such controls and control functions preferably are continuously set for automatic operation. Any operation in "automatic" mode can be taken over manually by activating the respective manual-auto switch to "manual" whereby any of the respective machine and implement control functions can be controlled manually.

The Implement Control System

As illustrated in FIG. 2, an entry status assembly 262 is mounted to I-beam 134 and extends toward the spigot end of pipe section 14. Entry status assembly 262 includes support bracket 264. Support bracket 264 supports "near" microswitch 266, "at entry" microswitch 268, and "engaged" microswitch 269. As suggested by FIG. 2, microswitches 266, 268, 269 are disposed at respective heights, and at longitudinal positions, whereby microswitch 266 is activated when the spigot end of pipe section 14 comes near the bell of the previously laid pipe section. Microswitch 268 is activated when the spigot is about to enter the bell. Microswitch 269 is activated when the spigot is fully engaged in the bell of the previously laid pipe section. The respective microswitches are releasably mounted on support bracket 264 such that the distance of each microswitch from the end of I-beam 234 can be adjusted at will, in order to activate the respective microswitch at the desired time, as described below.

The excavation machine is conventionally supplied with a main control valve body which receives valve driver commands according to manipulation of the conventional hydraulic controls by the operator. All such conventional hydraulic controls can still be used by the operator as desired.

The electronic and laser control system of the invention utilizes the conventional hydraulic controls already in place in the machine, and adds the following auxiliary control elements which feed the boom, stick and bucket cylinders through the main control valve body, and which otherwise feed auxiliary valves such as valves 146 on mast 144.

1. A horizontal plane laser transmitter such as a Topcon Model RL-HA self leveling rotating laser transmitter, available from Topcon America, Paramus, N.J.
2. A vertical plane laser transmitter, such as Topcon Model RL-DH, self leveling vertical/horizontal rotating laser transmitter.
3. Laser sensors as needed, such as Topcon Model LS-B2 laser receiver.
4. Motorized receiver mast for optional advanced automated control, such as Topcon Model TM-2 automated mast.
5. Electronic level sensors as needed, such as Topcon Model 9150P ceramic vial slope sensor.
6. Control boxes, such as Topcon Model System-V Dozer electronic control box.
7. Control, connection, and display panel 270 as described below.
8. Electric communication cables and hydraulic tubing as needed.

Figure 21:
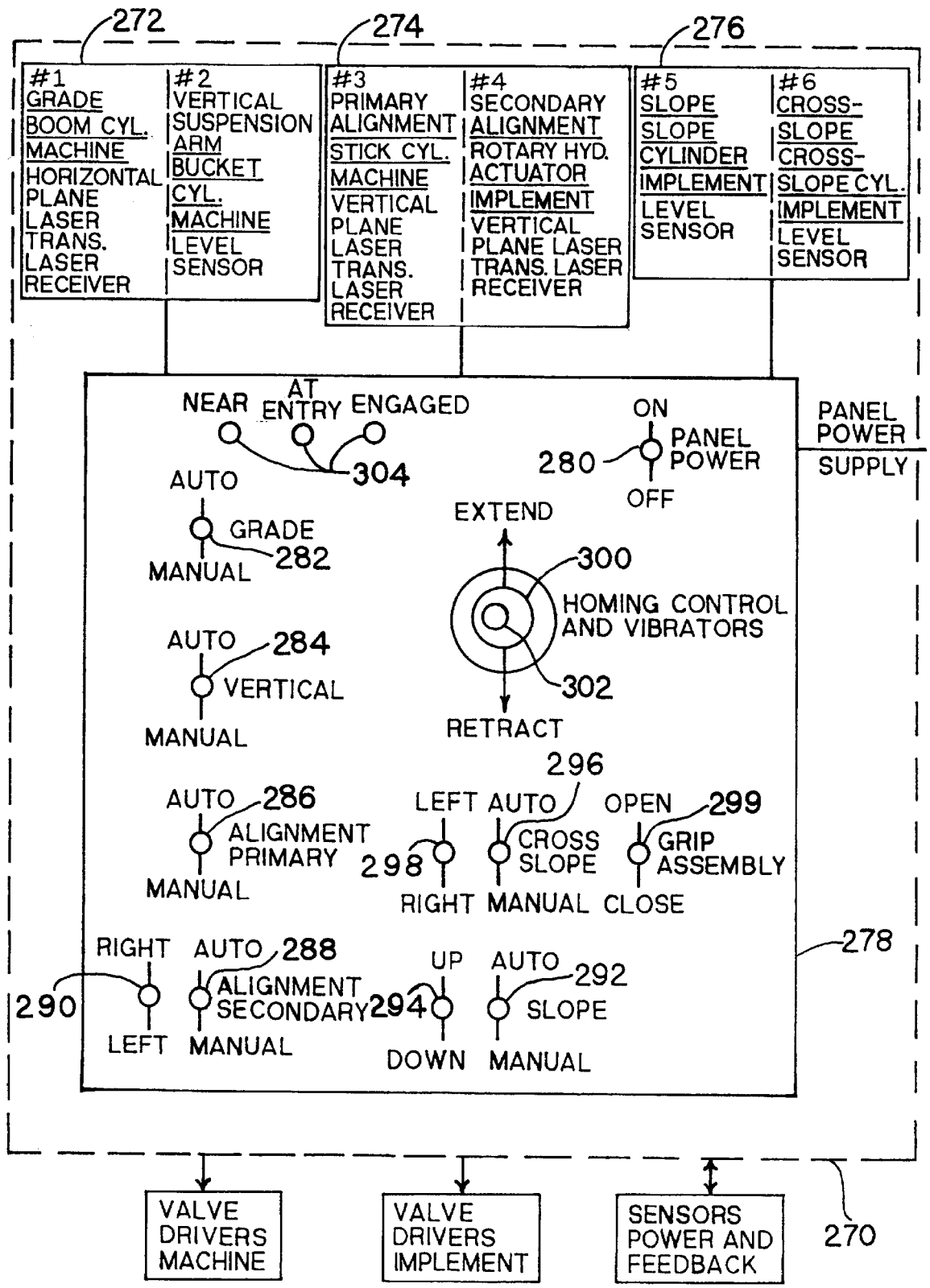
FIG. 21 shows a representative block diagram of a control panel useful in the invention.

As illustrated in FIG. 21, a separate control panel 270 is provided for the machine operator's use in controlling machine 10 and implement 12. Control panel 270, as illustrated in FIG. 21, contains three System-V Dozer control boxes 272, 274, 276. The front panel 278 of control panel 270 supports various indicator lights, and operator usable controls. Thus a panel power toggle switch 280 toggles the main power on and off. A Grade toggle switch 282 enables the operator to switch between manual and automatic control of the boom cylinders. In manual setting, the operator uses the conventional machine controls supplied with machine 10 to raise and lower the boom.

A Vertical toggle switch 284 enables the operator to switch between manual and automatic control of the bucket cylinder.

A Primary Alignment toggle switch 286 enables the operator to switch between manual and automatic control of the stick cylinder.

Secondary Alignment toggle switches 288 and 290 enable the operator to switch between manual and automatic control of rotary hydraulic actuator 70, and thus to control rotation of the grip assembly with respect to implement mounting interface 52, either automatically or manually.

Slope toggle switches 292, 294 enable the operator to switch between manual and automatic control of slope cylinder 102 and, in the manual setting to actuate the slope up or down.

Cross slope toggle switches 296, 298 enable the operator to switch between manual and automatic control of cross-slope cylinders 130, 132 and, in the manual setting, to actuate the cross-slope position toward the left or right side of the trench.

Grip toggle switch 299 enables the operator to engage or disengage the grip assembly about a pipe section.

Joy stick 300 enables the operator to manually and proportionally activate homing cylinder 121, thus to advance or retract the gripped pipe section toward and away from the previously laid pipe section. On/off button 302 on the joy stick enables the operator to manually turn vibrators 176 on and off.

Indicator lights 304 indicate, in sequence, when microswitches 266, 268, 270 have been activated at the bell end of the previously laid pipe section.

Figure 23:
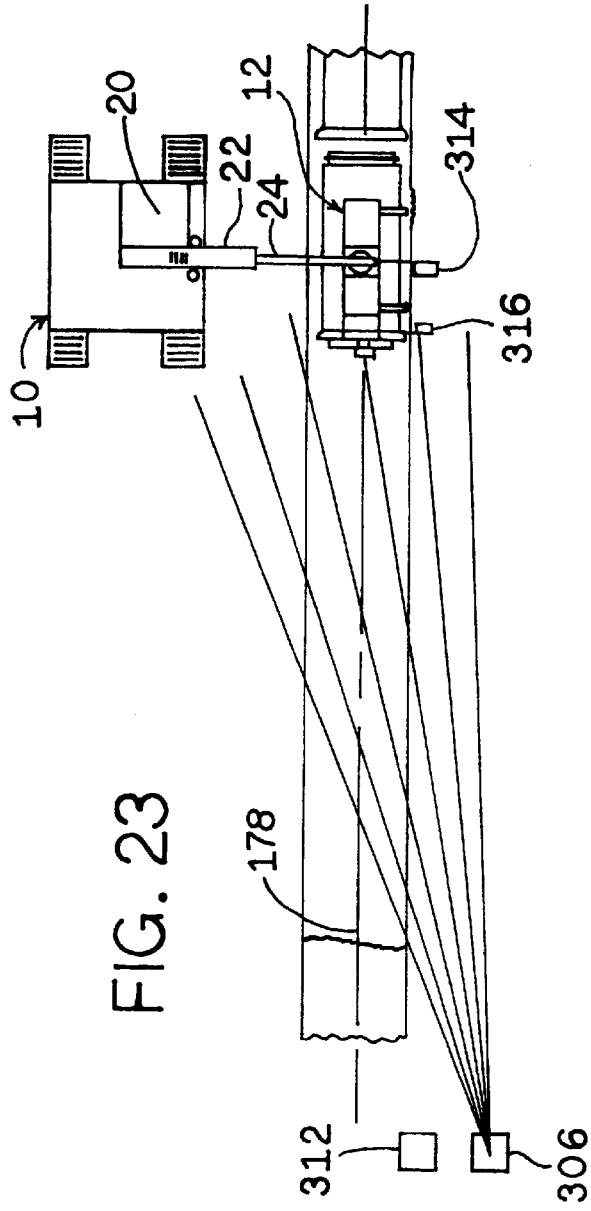
FIGS. 22 and 23 show a side elevation and a top view respectively of a horizontal plane laser transmitter set up alongside the trench and pipe line.
Figure 22:
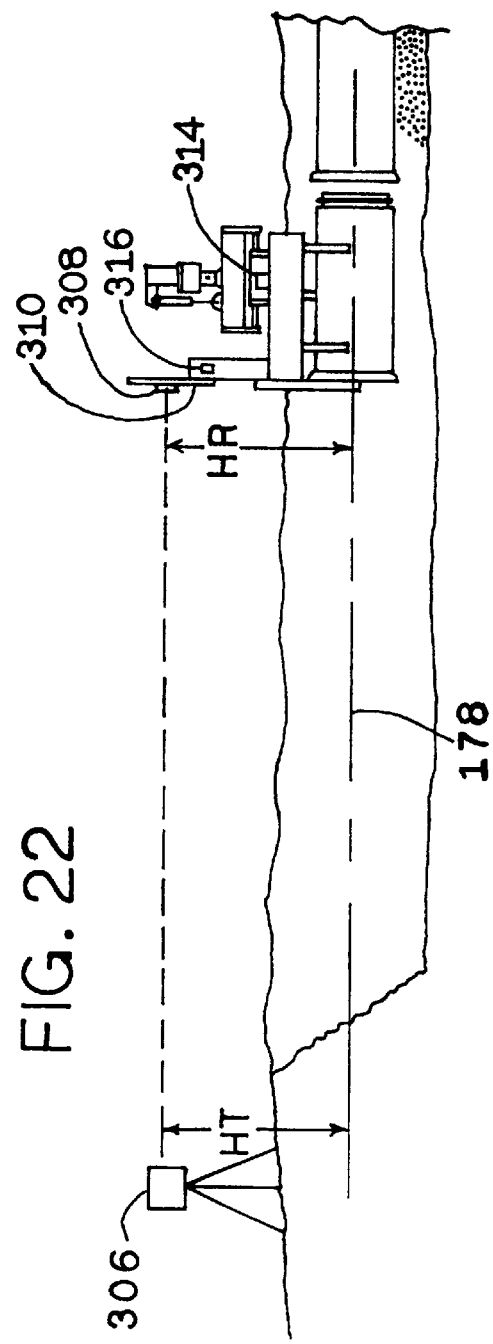

The control system works as follows. Horizontal laser transmitter 306, illustrated in FIGS. 22 and 23, is set up at the beginning or end of a pipe run to be laid, such that a rotating laser signal is transmitted in a generally horizontal plane and wherein the plane slopes along a line that tracks the specified slope of the line of pipe to be constructed. Thus, height "HT" at the transmitter, between the laser beam plane and the centerline of the pipe line, equals the height "HR" at the receiver, between the laser beam plane and the centerline of the pipe line. Transmitter 306 can be set anywhere beside the trench line so long as the plane transmitted is consistent with the slope of the pipe line to be constructed. Laser receiver 308 is mounted on grip assembly 50, preferably on a mast 310 whereby the height of receiver 308 can be adjusted as desired. The height of receiver 308 is consistent with the receiver being able to receive generally horizontal the laser signal from transmitter 306 well within the line and grade established for the pipe line.

In preferred embodiments, the motorized mast is used. The motorized mast drives the location of the receiver up and down on mast 310 to pick up the horizontal plane laser signal prior to the implement arriving at the desired grade, and to indicate to the operator, in real time, the ongoing deviation from the desired grade.

In general, a lift and place cycle involves gripping a pipe section, lifting the pipe section and moving the pipe section into alignment with the line of pipe sections already laid, engaging the spigot end of the pipe section with the bell end of the previously laid pipe section, adding and consolidating fill material about the pipe section while holding the pipe section suspended above the bottom of the trench, and releasing the pipe section from the grip assembly. The vibrators are effective to so thoroughly consolidate the fill material that, when the weight of the pipe section is released from the grip assembly, the released weight does not cause the fill material to recede and thus move the pipe section off the established alignment.

The grip assembly embodiment of FIG. 2 is used In the following illustration, The other embodiments of the grip assembly are used accordingly, providing for differences in the construction of the various grip assemblies. At the start of a cycle, the operator of machine 10 moves the machine adjacent the position where a pipe section is to be laid, generally with the tracks or wheels of the vehicle directed parallel to the line of the trench as in FIG. 23.

Grade switch 282 and Primary Alignment switch 286 are switched to Manual. Switches 284 (vertical suspension arm), 288, 290 (secondary alignment), 292, 294 (slope), and 296, 298 (cross slope) are set on automatic. Joy stick 300 is used to move homing cylinder 121 fully toward homing stop 154. Vibrators 176 are turned off.

The grip assembly is set to disengage.

With the controls so set, the operator has normal manual control of the boom, the stick, and rotation of the boom about the base of the vehicle, the operator moves the implement over a pipe section which has been placed within reach beside the trench. With gripping finger 138 retracted into the disengage position, cylinder 140 retracted, the operator then lowers the implement over the pipe section such that gripping finger 138 and stops 136 are on opposite sides of the pipe section, low enough that closing finger 138 against stops 136 captures the pipe section between finger 138 and stops 136. In addition the operator rotates the boom about base 16 thus to bring homing stop 154 adjacent or into engagement with the bell end of the pipe section.

Having accomplished this positioning, the operator engages the grip assembly about the pipe section using grip assembly switch 299. The operator then lifts the pipe section and moves the pipe section to a position generally over the trench using the conventional boom, stick and swing controls. When the operator gets the height of the pipe section close enough to grade that receiver 308 can receive the signal from transmitter 306, the operator switches grade control to auto using switch 282. Valve driver signals from receiver 308 are sent to control panel 270 at control box 272. Control box 272 sends appropriate electronic commands to the hydraulic boom circuit of the machine to adjust the height of the boom thus to bring the height of the pipe section into an alignment relationship with the horizontal plane laser signal, and thus into an alignment relationship with the centerline of the line of previously laid pipe sections.

Vertical laser transmitter 312, illustrated in FIGS. 24 and 25, is set up at the beginning or end of the pipe run, generally at the same time the horizontal laser transmitter is set up. The vertical laser transmitter is set up such that a rotating laser signal is transmitted in a generally vertical plane, parallel to and offset from the centerline of the pipe line. Laser receiver 314 is mounted on grip assembly 50, extending transversely of grip assembly 50 from suspension axis 91. Receiver 314 is offset from the pipe line the same amount that the vertical rotating laser signal is offset from the pipe line. Laser receiver 316 is also mounted to grip assembly 50 but above receiver 316 and at an end of the grip assembly, with the same offset from the centerline as receiver 314 and transmitter 312. Thus receiver 316 is spaced from receiver 314 both longitudinally and vertically. Both receivers 314 and 316 are in alignment with the vertical plane when the centerline of the pipe section is aligned with the centerline of the pipe run.

When the operator lowers implement 12 into the trench, and switches to autograde he also switches the alignment function from manual to auto using switch 286. Valve driver signals from receiver 314 are sent to control panel 270 at box 274. Box 274 sends electronic commands to the hydraulic stick circuit of machine 10, bringing receiver 314 into precise alignment with the vertical plane laser signal, and thus laterally positioning the pipe section, left or right, with respect to the centerline of the previously laid pipe sections.

Once the receiver 314 is being maintained in alignment with the vertical plane laser signal, receiver 316 is automatically activated as a slave receiver, whereupon receiver 316 begins sending signals to control panel 270 at control box 274. When in the auto alignment mode, control box 274 sends electronic commands to the hydraulic rotator circuit on implement 12, namely through valve #1, to bring receiver 316 into alignment with the vertical plane rotating laser signal, which brings the centerline of the pipe section into alignment with the vertical plane containing the pipe line centerline.

Level sensor 318 is mounted on the flat surface at the top of yoke 54, in line with suspension arm axis 91. The sensing line of sensor 318 is perpendicular to the axis of suspension element pin 36. In the automatic mode, signals indicating the relationship of the sensing line to level are regularly fed to control panel 270, at control box 272. Control box 272 generates electronic valve driver signals controlling the bucket cylinder circuit of machine 10 on a regular basis, whereby suspension arm 56 is continuously maintained in a vertical orientation. A precise vertical orientation is desired because the overall orientations and positioning of implement 12 assume a vertical suspension axis base line about which to position the remaining elements of the implement.

Level sensor 320 is mounted to grip assembly 50, for example on mast 144 as shown in FIG. 2, with its sensing line and mounting surface parallel to the centerline of pipe section 14. In auto mode, sensor 320 sends signals to control panel 270, namely control box 276. Control box 276 sends valve driver signals to the hydraulic slope circuit, namely valve #2, thus to maintain the pipe section at the preselected angle of slope of the line of pipe being laid. Thus, when the pipe section first approaches the line of pipe being laid, pipe section 14 is already on slope before being brought into full alignment using the other controls on implement 12.

Finally, level sensor 322 is mounted on grip assembly 50 with its mounting surface parallel to the centerline of pipe section 14, and its sensing line perpendicular to the centerline of pipe section 14. In auto mode, sensor 322 sends signals to control panel 270, namely control box 276. Control box 276 senses valve driver signals to the hydraulic cross slope circuit, namely valve #3, thus to maintain a level cross slope, using cylinders 130, 132.

Pivot pin 106 is the locus of pivotation when slope cylinder 102 is activated. Ram 108 is directly under and proximate pivot pin 106. Activation of slope cylinder 102 pivots support structure 48 about pivot pin 106. Activation of cross-slope cylinders 130, 132 pivots grip assembly 50 about ram 108. By virtue of the general alignment of both pivot pin 96 and ram 108 with suspension arm axis 91, and the proximity of pivot pin 96 and ram 108 to each other, the combined operation of pivot pin 96 and ram 108 performs approximately like a mechanical universal joint, whereby the desired semi-automatic alignment with the specified pipe line can be virtually assured.

Given the above, when the operator brings the implement over the trench, slope and cross-slope are already being maintained at their set points. Also the suspension arm is already being maintained in vertical orientation. Once the operator sets the grade and primary alignment switches to auto mode, the control system automatically brings the pipe into alignment with the centerline of the pipe line already laid. The last element of the alignment is typically the secondary alignment which begins only after primary alignment has been achieved.

With all alignment completed, the operator uses the machine swing control to bring the pipe to within a few inches of the bell end of the previously laid pipe section. Namely, the pipe section must be brought close enough to the bell end that the 12 inch stroke of homing cylinder 121 can be employed to engage the spigot of the pipe section being gripped into the bell of the previously laid pipe section. Once the spigot has been brought sufficiently close to bell end 168P, the operator uses joy stick 300 to manually extend homing cylinder 121, and thus the pipe section 14, toward bell end 168P.

As grip assembly 50 moves toward bell end 168P, microswitch 266 is activated as it reaches the bell end of the previously laid pipe section 14P, sending a signal which lights the "near" light on front panel 278. Indeed, the operator may continue to use swing of the machine until microswitch 266 activates the "near" light. As the grip assembly continues to move toward pipe section 14P, microswitch 268 engages the end of pipe section 14P, lighting the "at entry" light on front panel 278. Assuming the microswitches have been positioned as indicated in FIG. 2, the end of the spigot is aligned with the end of the bell, just prior to actual entry of the spigot into the bell, when the "at entry" light illuminates. As the grip assembly advances still further, spigot 166, including seal 164, enters and thus engages bell 168P, whereupon microswitch 269 engages the end of pipe section 14P, lighting the third light 304 on front panel 278. When the operator sees the "engaged" light 304 lit, he knows the pipe has been sufficiently engaged.

Up to this point, pipe section 14 has been maintained suspended above the bottom of the trench by implement 12 and machine 10. The operator continues to hold the pipe section so suspended while fill material is added through fill distribution system 200. Fill material can be placed into hopper 202 by e.g. an auger fed from a truck. In the alternative, a larger hopper can be employed thus to receive fill material from a front end loader. Typical such fill material is gravel or pebbles, any particulate material which can be gravity fed, and which can be suitably consolidated by use of vibrators 176. Distribution system 200 is used only as a distribution system, and thus does not retain any fill material. Accordingly, distribution system is always empty except when it is being used to emplace fill material about and under a pipe section.

When the fill material is to be fed through fill distribution system 200, the operator uses button 302 to turn on vibrators 176. Vibrators 176 are positioned generally below each of chutes 206 such that the fill material falls around and encompasses vibrators 176, such that the centers of the piles of fill material being delivered by chutes 206 are located closed to vibrators 176. Vibration of vibrators 176 is effective to settle and consolidate the fill material such that the vibrated fill material is sufficiently dense to support the pipe section on grade and in line when the weight of the pipe section is released to the underlying fill material.

As illustrated in FIGS. 13 and 24, the fill material is placed generally at the mid-point of the length of the pipe section and at the spigot end of the pipe section. Given such placements, the mid-point of weight of the pipe section is sufficiently supported that the pipe section is stable when released from implement 12, while no fill material is placed at bell end 168 of the newly-laid pipe section. Thus, the bell end is maintained clean and free from fill material which might otherwise interfere with entry of the spigot of the next laid pipe section.

Once a suitable amount of fill material has been emplaced under and around the newly laid pipe section, and consolidated to suitable density, vibrators 176 are turned off using switch 302. Switch 299 is actuated to disengage, thus to open, the grip assembly, moving grip finger 138 away from the pipe section. The operator also resets grade switch 282 and primary alignment switch 286 to manual mode. The operator then has conventional control of the boom and stick, using the conventional hydraulic controls provided by the manufacturer of machine 10. All the other control functions are typically left on "Auto" through multiple cycles of picking up a section of pipe and placing and engaging the pipe section into the pipe line. The operator then lifts the boom, and rotates extensible working elements 17 to the next pipe section to be picked up and placed in the pipe line.

In the embodiment illustrated in FIG. 21, each of control boxes 272, 274, 276, controls two mutually independent closed-loop hydraulic circuits. Each such circuit includes the respective hydraulic actuator and hydraulic supply lines and valves, the electronic control circuitry in the respective control box, and the respective sensor which feeds e.g. position and/or orientation signals to the control box. Such circuit independence does allow for, a desired cooperation of the circuits with each other, such as the timing of the secondary alignment circuit to activity of the primary alignment circuit.

As used herein, alignment with respect to suspension arm axis 91 is measured when the grip assembly is fully retracted toward homing stop 154.

Gripping of the pipe section by grip elements, for example grip finger 138, is always manual control, activated and released by the operator of machine 10.

Similarly, inserting the spigot end of the pipe section being handled, into the bell end of the previously laid pipe section is a manual operator function, using manual hydraulic controls in the cab to activate 2-way ram 108.

Further, turning vibrators 176 on and off is a manual operator function using manual hydraulic controls in the cab.

The discussion herein focuses on a central longitudinal axis of e.g. a pipe section as a reference from which distances and angles are measured or determined. In the alternative, the bottom or invert of such pipe section can be used as such reference, making allowance for the distance from such bottom or invert.

As used herein, the phrase "grade, slope, and line" has specific meaning regarding the positioning and orientation of the pipe section being handled. All references are taken from the longitudinal centerline of the pipe section. However, the same references could as well be taken from the invert, namely the bottom-most surface, of the pipe section, excluding the bell. To that end. "grade" refers to elevation. "Slope" refers to the angle of the pipe section measured from a horizontal line. "Line" addresses the relationship of the centerline of the pipe section of interest to the running centerline of the end ones of the previously laid pipe sections. To that end, "line" requires alignment of the centerline of the pipe section being handled with the centerline of the previously laid pipe sections. Such alignment includes both a positioning element wherein a central portion of the centerline of the pipe section is brought into alignment with the line of laid pipe sections, and an orientation element wherein the centerline of the pipe section is brought into directional parallelism with the centerline of the in-place portion of the pipe line. As used herein, the directional element contemplates only direction with respect to the Z axis, the directional element with respect to the Y axis being embodied in the expression "slope." To the extent activating the directional element moves the positional element out of alignment, the positional element is again adjusted to line. Adjustments to the positional and rotational elements may be continued until both elements are in proper alignment with the line of previously laid pipe sections.

As used herein, the X axis refers to an axis aligned with or parallel to the centerline of the pipe line, thus aligned with or parallel to the central longitudinal axis 178, of a pipe section being gripped by the grip assembly. The Y and Z axes are mutually perpendicular to the X axis, and to each other. The Z axis intersects the X and Y axes. The Y axis may not intersect the X axis.

As used in connection with the control system herein, the term "semi-automatic" recognizes the role of the operator in operating a variety of controls according to visual observation while relying on various sensors feeding closed-loop actuator circuits to thereby accomplish part of the positioning and/or orientation of the workpiece with no more operator participation then activation of the respective automatic closed-loop circuits.

While the description herein focuses on laser signals and laser signal receivers, any type of line beam signal can be used so long as the signal is a sharply focused linear alignment signal or beam. Thus, the signal must exist in line or line element format, and must be sufficiently sharply focused to provide adequate radial discrimination to suitably establish the positions and directions necessary, in combination, to define specific locations against which the positions and orientations of the respective pipe sections can be assessed. Accordingly, focused line beam signals other than laser signals can be used, along with suitable sensors therefore, so long as the required specificity of location and/or direction can be satisfied.

Accordingly, all such suitable signals are to be included in the claims that follow, and are within the meaning of "laser signals" and "laser sensors."

All pressure cylinders are illustrated herein as hydraulic cylinders. Other working fluids can be used as desired. Further, electrically operated devices can be substituted for some or all of the hydraulic devices as desired.

Those skilled in the art will now see that certain modifications can be made to the apparatus and methods herein disclosed with respect to the illustrated embodiments, without departing from the spirit of the instant invention. And while the invention has been described above with respect to the preferred embodiments, it will be understood that the invention is adapted to numerous rearrangements, modifications, and alterations, and all such arrangements, modifications, and alterations are intended to be within the scope of the appended claims.

To the extent the following claims use means plus function language, it is not meant to include there, or in the instant specification, anything not structurally equivalent to what is shown in the embodiments disclosed in the specification.

Having thus described the invention, what is claimed is:

1. A working implement for lifting and positioning successive sections of elongate workpieces, end to end, and engaging respective ends of adjoining such sections of elongate workpieces, said implement comprising:
    (a) a mounting assembly having an implement mounting interface adapted and configured to attach said implement to an end of a working arm of a working vehicle having a cooperating machine mounting interface for securely mounting said working implement to such working vehicle such that said working implement at all times moves as one with movement of such end of such working arm of such working vehicle;
    (b) a grip assembly for gripping elongate workpieces to be lifted and positioned by said working implement;
    (c) orienting apparatus affecting orienting of said grip assembly with respect to respective Y and Z axes of such elongate workpiece being gripped by said grip assembly, the Y and Z axes, respectively, being perpendicular to each other, the Y axis extending generally horizontally transverse to a centerline of such workpiece, the Z axis extending upwardly, perpendicular to the longitudinal centerline of such elongate workpiece; and
    (d) linear displacement apparatus displacing said grip assembly, and correspondingly such elongate workpiece being gripped by said grip assembly, along a longitudinal such X axis of such elongate workpiece, and thereby linearly displacing said grip assembly with respect to said mounting assembly.

2. A working implement as in claim 1, said implement mounting interface comprising (i) a suspension mounting element for suspending said implement from such working arm, for pivotation with respect to such working arm, and (ii) a control mounting element for receiving a control element on the working arm of the working vehicle and thereby controlling pivotation of said implement with respect to said working arm, about said suspension mounting element.

3. A working implement as in claim 1, the secure mounting of said mounting assembly to such working vehicle enabling an operator of such vehicle and correspondingly of said working implement to hold such pipe section suspended at grade, slope, and line above an underlying support surface and simultaneously to affect linear insertion of such pipe section into an end of a previously laid pipe section.

4. A working implement as in claim 1, the orienting and positioning apparatus further affecting positioning of said grip assembly with respect to an X axis parallel to the centerline of such elongate workpiece being gripped in said grip assembly.

5. Working apparatus for lifting and positioning successive sections of elongate workpieces, end to end, and engaging respective ends of adjoining such sections of elongate workpieces, said apparatus comprising:
- (a) a working vehicle movable along a path following a course along which such elongate workpieces are to be laid, said working vehicle comprising a working arm having an outer end portion movable with respect to the course, separate from movement of said vehicle, the outer end portion including a machine mounting interface for mounting an implement to said working arm; and
- (b) a working implement comprising
  - (i) a mounting assembly having an implement mounting interface rigidly mounting said working implement to an end of said working arm at said machine mounting interface, whereby said working implement at all times moves as one with movement of the end of said working arm of said working vehicle,
  - (ii) a grip assembly for gripping such elongate workpieces to be lifted and positioned by said working apparatus,
  - (iii) orienting and positioning apparatus effecting orienting of said grip assembly about respective Y and Z axes, the Y axis extending generally horizontally transverse to a centerline of such workpiece, the Z axis extending upwardly, perpendicular to the longitudinal centerline of such elongate workpiece, said Y and Z axes being perpendicular to each other, and
  - (iv) linear displacement apparatus displacing said grip assembly, and correspondingly such elongate workpiece being gripped by said grip assembly, along a longitudinal X axis of such elongate workpiece, and thereby linearly displacing said grip assembly and such workpiece, with respect to said mounting assembly.

6. Working apparatus as in claim 5, said machine mounting interface and said implement mounting interface, in combination, defining (i) a first suspension mounting element suspending said implement from said working arm, for pivotation with respect to such working arm, and (ii) a control mounting element receiving a control element on the working arm and thereby controlling pivotation of said working implement with respect to said working arm, about said suspension mounting element.

7. Working apparatus as in claim 5 wherein, when said working arm is held stationary with a first longitudinal axis of a gripped first elongate workpiece in alignment with a second longitudinal axis of a previously laid second elongate workpiece, including grade, slope, and line, and said linear displacement apparatus is activated to linearly displace the gripped first elongate workpiece into engagement with the previously laid second elongate workpiece along the aligned axes, with concomitant resistance from the previously laid second elongate workpiece during engagement of the gripped first elongate workpiece with the previously laid second elongate workpiece, the position of said implement mounting interface remains stationary with respect to the previously laid second elongate workpiece, and the first axis of the gripped first elongate workpiece remains in substantial alignment with the second axis of the previously laid second elongate workpiece along grade and line while the gripped first elongate workpiece is being linearly displaced into engagement with the previously laid second elongate workpiece.

8. Lifting and positioning apparatus for lifting and positioning successive sections of elongate workpieces, end to end, and engaging respective ends of adjoining such sections of elongate workpieces, said lifting and positioning apparatus comprising:
- (a) a mounting assembly for mounting said lifting and positioning apparatus to a working arm of a working vehicle, said mounting assembly including a downwardly extending suspension arm and a downwardly extending central longitudinal suspension arm axis;
- (b) a grip assembly having gripping elements for gripping elongate workpieces to be lifted and positioned by said lifting and positioning apparatus, gripping of a such elongate workpiece by said gripping elements defining a longitudinal center line of the workpiece in said grip assembly; and
- (c) a first level sensor sensing level orientation of a plane perpendicular to the suspension axis, and thus sensing orientation of the suspension axis in the plane, with respect to a vertical line.

9. Lifting and positioning apparatus as in claim 8, including a second level sensor sensing angular orientation, about a generally horizontal second axis, the second axis being perpendicular to a longitudinal centerline of such elongate workpiece being gripped by said grip assembly.

10. Lifting and positioning apparatus as in claim 8, including orienting and locating apparatus affecting orienting and locating of said grip assembly and thus orienting and transverse locating of such elongate workpiece in said grip assembly, thereby affecting orienting and transverse locating of the centerline of such elongate workpiece in said grip assembly.

11. Lifting and positioning apparatus as in claim 9, including orienting and locating apparatus affecting orienting and locating of said grip assembly and thus orienting and transverse locating of such elongate workpiece in said grip assembly, thereby affecting orienting and transverse locating of the centerline of such elongate workplace in said grip assembly.

12. Lifting and positioning apparatus as in claim 11, further comprising control apparatus receiving signals from said first and second level sensors, and computing and sending control signals to said orienting and positioning apparatus thus to adjust a slope angle of such elongate workpiece.

13. Working apparatus for lifting and positioning successive sections of elongate workpieces, end to end, and engaging respective ends of adjoining such sections of elongate workpieces, said apparatus comprising:
- a working vehicle, movable along a path following a course along which such sections of elongate workpieces are to be laid in a line, and lifting and positioning such sections of elongate workpieces;
- lifting and positioning apparatus as in claim 8 mounted to said working vehicle, including a first laser signal receiver receiving an approximately horizontal plane laser signal aligned with a slope of the line of elongate workpieces to be positioned, second and third laser signal receivers spaced longitudinally with respect to a centerline of such workpiece gripped by said grip assembly, receiving a vertical plane laser signal parallel to such line of elongate workpieces, said orienting and locating apparatus affecting orienting said grip assembly with respective X, Y, and Z axes, the X axis extending in a direction generally along or parallel to the centerline of such workpiece, the X, Y, and Z axes being perpendicular to each other, control apparatus receiving signals from said first, second, and third laser signal receivers, and said first level sensor, and determining and sending control signals to one or more of said working vehicle and said lifting and positioning apparatus, thus to bring the center line of such elongate workpiece, gripped in said grip assembly, into vertical and horizontal position, and into axial alignment with the line of elongate workpieces previously laid.

14. A working implement for lifting and positioning successive sections of elongate workpieces, end to end, and engaging respective ends of adjoining such sections of elongate workpieces, said working implement comprising:

(b) a mounting assembly for mounting said working implement to a working arm of a working vehicle;

(c) a grip assembly for gripping elongate workpieces to be lifted and positioned by said working implement;

(d) orienting apparatus affecting orienting of said grip assembly with respect to respective Y and Z axes of such elongate workpiece being gripped by said grip assembly, the Y and Z axis, respectively, being perpendicular to each other, the Y axis extending generally horizontally transverse to a centerline of such workpiece, the Z axis extending upwardly, perpendicular to the longitudinal centerline of such elongate workpiece; and (e) first and second vibrators suspended from said working implement such that respective first and second vibrating elements of said first and second vibrators are disposed at respective locations alongside and displaced from said implement so as to vibrate independently of any vibration of the work piece, such that fill material placed alongside an elongate workpiece being held suspended in said grip assembly, at specified grade, slope, and line above an underlying support surface thus to support such elongate workpiece from the underlying support surface, comes into operating contact with said vibrators, whereby vibration of said vibrators transmits vibrations directly to the fill material and thereby assists with consolidating such fill material along such elongate workpiece, thus to support such elongate workpiece from the underlying support surface such that after such consolidation, the elongate workpiece can be released from said grip assembly and remain within tolerances of the specified grade, slope, and line, supported from the underlying support surface.

15. A working implement for lifting and positioning successive sections of elongate workpieces, end to end, and engaging respective ends of adjoining such sections of elongate workpieces, said working implement comprising:

(a) a mounting assembly for mounting said working implement to a working arm of a working vehicle;

(b) a grip assembly for gripping elongate workpieces to be lifted and positioned by said working implement;

(c) linear displacement apparatus including a linear displacement actuator having a length, said linear displacement apparatus having a linear displacement axis generally parallel to a longitudinal axis of such elongate workpiece being gripped by said grip assembly, and displacing said grip assembly and correspondingly such elongate workpiece along the longitudinal axis of such elongate workpiece, and thereby linearly displacing said grip assembly with respect to said mounting assembly; and (d) orienting and positioning apparatus affecting orienting and positioning of said grip assembly and said linear displacement apparatus with respect to X, Y, and Z axes respectively perpendicular to each other, the X axis corresponding to the linear displacement axis and extending generally parallel to the longitudinal axis of such elongate workplace being gripped by said grip assembly, the Z axis being an upstanding axis, said orienting and positioning apparatus including a transverse cross-slope actuator affecting transverse displacement of said grip assembly along an arcuate path defined by pivoting about the linear displacement axis, thus to move said grip assembly in an arc transverse to the longitudinal axis of such elongate workpiece.

16. A working implement as in claim 15, further comprising support structure between said mounting assembly and said linear displacement apparatus, said linear displacement apparatus comprising 2-way working cylinder apparatus having a ram thereof mounted to said support structure and thereby assisting in linear displacement of said grip assembly with respect to said support structure, and further thereby supporting said grip assembly, said transverse cross-slope actuator being mounted to said support structure and affecting pivoting of an outer housing of said working cylinder apparatus about said ram, whereby said pivoting of said grip assembly transverse to the longitudinal axis of the workplace comprises pivoting of said outer actuator housing with respect to said ram.

17. A working implement for lifting and positioning successive sections of elongate workpieces, end to end, and engaging respective ends of adjoining such sections of elongate workpieces to thereby establish a line of workpieces extending in a specified direction at specified grade and slope, said implement comprising:

(a) a mounting assembly for mounting said working implement to a working arm of a working vehicle, said mounting assembly including a suspension mounting element, and a control mounting element, a downwardly extending suspension arm and a downwardly extending central longitudinal suspension arm axis;

(b) a grip assembly for gripping elongate workpieces to be lifted and positioned by said working implement, said grip assembly, when gripping an elongate workpiece for working manipulation thereof, defining a centerline of the elongate workpiece in said grip assembly;

(c) orienting and positioning apparatus affecting orienting and positioning of said grip assembly with respect to respective X, Y, and Z axes respectively perpendicular to each other, said mounting assembly and the remainder of said working implement, in combination, defining a line of suspension extending generally from said suspension mounting element downwardly in a line passing proximate the centerline of the elongate workpiece; and (d) sensors suitable to establish grade, slope and line of such elongate workpiece gripped in said grip assembly, including (i) a first grade beam receiver in a plane containing the central suspension axis and perpendicular to the centerline of such elongate workpiece, for receiving a location signal broadcast specifically along the progressive grade, thus to establish grade of such elongate workpiece along the central suspension arm axis, (ii) a second level sensor sensing level orientation of a plane perpendicular to the suspension axis, and thus sensing orientation of the suspension axis in the plane, with respect to a vertical line, (iii) third and fourth line beam sensors sensing a line beam signal defined in an imaginary vertical plane extending along the specified direction, and (iv) a fifth level sensor sensing level orientation along the centerline of the workpiece with respect to a horizontal reference line.

18. A working implement as in claim 17, said third and fourth line beam sensors assisting in establishing the line of the elongate workpiece along the direction specified for the line of elongate workpieces.

19. A working implement as in claim 17, including a sixth level sensor sensing level orientation perpendicular to the centerline of the workpiece with respect to a vertical reference line.

20. Working apparatus for lifting and positioning successive sections or elongate workpieces, end to end, and engaging respective ends of adjoining such sections of elongate workpieces, said working apparatus comprising:

(a) a working vehicle movable along a path following a course along which such sections of elongate workpieces are to be laid in a line, said working vehicle comprising a working arm having an outer end portion movable with respect to the course, separate from movement of said vehicle, the outer end portion including a machine mounting interface for mounting an implement to said working arm; and (b) a working implement comprising
  (i) a mounting assembly mounting said working implement to said working arm of said working vehicle, said mounting assembly including a downwardly extending suspension arm and a corresponding downwardly extending central longitudinal suspension arm axis,
  (ii) a grip assembly for gripping such elongate workpieces to be lifted and positioned by said working apparatus,
  (iii) orienting and positioning apparatus affecting orienting and positioning of said grip assembly about respective X, Y, and Z axes, respectively perpendicular to each other, the X axis being in a substantially vertical plane containing a longitudinal centerline of such elongate workpiece being gripped by said grip assembly,
  (iv) a first level sensor mounted on said mounting assembly and sensing level orientation of a line in a plane perpendicular to the suspension axis, and thus sensing an angle of the suspension axis in the plane, with respect to a vertical line, and a first actuator responsive to said first level sensor thereby to minimize the sensed angle,
  (v) a second level sensor operative to sense level orientation of a line parallel to a centerline of such elongate workpiece, and a second actuator on said working implement responsive to said second level sensor thereby to establish and maintain a desired slope of a centerline of such elongate workpiece being gripped by said grip assembly, and
  (vi) a third level sensor sensing level orientation of a line transverse to the centerline of such elongate workplace being gripped in said grip assembly, and a third actuator responsive to said third level sensor thereby to minimize the deviation of the line from horizontal, axes of pivotation of such elongate workpiece corresponding to pivoting movement affected by said second and third actuators being sufficiently close to each other as to approximate a mechanical universal joint.

21. A method of engaging a pipe section on grade, slope, and line with a previously laid such pipe section, comprising:

using a working machine in combination with a working implement wherein the working implement is rigidly mounted to the working machine, and whereby the position of the implement at an implement-machine interface can be maintained stable while the pipe section is linearly inserted into a previously laid pipe section, and can be retained at the specified grade, slope, and line while fill material is emplaced and consolidated about and under the pipe, with sufficient density that the pipe section can be released without the pipe section moving outside normal tolerances of the specified grade, slope and line, semiautomatically bringing the pipe section into engagement with a previously laid section of pipe, such semi-automatic bringing comprising
  (a) the machine and implement automatically bringing the pipe section to specified grade, automatically bringing the pipe section into position and angular alignment with respect to the specified pipe line, automatically establishing and holding specified slope, and optionally cross-slope, of the pipe section, and
  (b) an operator manually activating a linear engagement actuator and thereby engaging the pipe section with a previously laid pipe section.

22. A method as in claim 21 wherein the semi-automatic method further comprises automatically maintaining the alignment of the pipe section with the previously laid pipe section while the operator manually activates linear engagement of the pipe section with the previously laid pipe section.

* * * * *